(12) United States Patent
Courville et al.

(10) Patent No.: US 11,657,285 B2
(45) Date of Patent: May 23, 2023

(54) METHODS, SYSTEMS, AND MEDIA FOR RANDOM SEMI-STRUCTURED ROW-WISE PRUNING IN NEURAL NETWORKS

(71) Applicant: XFUSION DIGITAL TECHNOLOGIES CO., LTD., Zhengdong (CN)

(72) Inventors: Vanessa Courville, Montreal (CA); Mehdi Ahmadi, Montreal (CA); Mahdi Zolnouri, Montreal (CA)

(73) Assignee: XFUSION DIGITAL TECHNOLOGIES CO., LTD., Zhengdong (CN)

( * ) Notice: Subject to any disclaimer, the term of this patent is extended or adjusted under 35 U.S.C. 154(b) by 329 days.

(21) Appl. No.: 16/943,573

(22) Filed: Jul. 30, 2020

(65) Prior Publication Data

US 2022/0036189 A1 Feb. 3, 2022

(51) Int. Cl.
*G06N 3/08* (2023.01)
*G06N 3/082* (2023.01)
*G06N 3/04* (2023.01)
*G06F 16/215* (2019.01)

(52) U.S. Cl.
CPC ........... *G06N 3/082* (2013.01); *G06F 16/215* (2019.01); *G06N 3/04* (2013.01)

(58) Field of Classification Search
CPC ......... G06N 3/082; G06N 3/04; G06F 16/215
USPC ........................................................ 706/25
See application file for complete search history.

(56) References Cited

U.S. PATENT DOCUMENTS

| | | | | |
|---|---|---|---|---|
| 10,339,439 | B2* | 7/2019 | Lipasti | G06N 3/08 |
| 2020/0285446 | A1* | 9/2020 | Han | G06F 7/5443 |
| 2020/0293867 | A1* | 9/2020 | Shao | G06F 17/16 |
| 2020/0311549 | A1* | 10/2020 | Wang | G06N 3/045 |
| 2020/0394520 | A1* | 12/2020 | Kruglov | G06N 3/082 |
| 2021/0125071 | A1* | 4/2021 | Ren | G06N 3/04 |

OTHER PUBLICATIONS

Chaber et al., "Pruning of recurrent neural models: an optimal brain damage approach", Nonlinear Dyn (2018) 92:763-780 (Year: 2018).*

(Continued)

*Primary Examiner* — Omar F Fernandez Rivas
*Assistant Examiner* — Tri T Nguyen
(74) *Attorney, Agent, or Firm* — Rimon PC

(57) ABSTRACT

Methods, systems and media for random semi-structured row-wise pruning of filters of a convolutional neural network are described. Rows of weights are pruned from kernels of filters of a convolutional layer of a convolutional neural network according to a pseudo-randomly-generated row pruning mask. The convolutional neural network is trained to perform a particular task using the pruned filters that include the rows of weights that have not been pruned from the kernels of filters. The process may be repeated multiple times, with the best-performing row pruning mask being selected for use in pruning row weights from kernel filters when the trained convolutional neural network is deployed to processing system and used for an inference. Computation time may be decreased further with the use of multiple parallel hardware computation units of a processing system performing pipelined row-wise convolution.

20 Claims, 13 Drawing Sheets

(56) References Cited

OTHER PUBLICATIONS

Le Cun, Yann et al., "Optimal Brain Damage", (NIPS 1990).
Han, Song et al., Deep Compression: Compressing Deep Neural Networks with Pruning, Trained Quantization and Huffman Coding., arXiv preprint arXiv:1510.00149, 2015.
He, Yang et al., "Soft Filter Pruning for Accelerating Deep Convolutional Neural Networks", arXiv preprint arXiv:1808.06866, 2018.
Liu, Zhuang et al., "Learning Efficient Convolutional Networks Through Network Slimming", Proceedings of the IEEE International Conference on Computer Vision (pp. 2736-2744), 2017.
Mittal, Deepak et al., "Recovering from Random Pruning: on the Plasticity of Deep Convolutional Neural Networks", arXiv:1801.10447v1, Jan. 31, 2018.
Zhu, Michael H. et al., "To prune, or not to prune: exploring the efficacy of pruning for model compression", arXiv:1710.01878v2, Nov. 13, 2017.

* cited by examiner

Algorithm 1: Generate random mask with LFSR

Inputs: s := Seed Value, t := threshold, k := kernel size, ic := number of input channel, oc := number of output channel
Output: m := a mask for all weights of the current layer
Initialize: m:=[], rm:=[], em:=[], max := ic * k, rv := s

```
for i ← 1 to max do
    rv ← calculate_shift_bit_LFSR(rv)
    if rv >= max then
        rv ← normalize(rv)
    if rv >= t then
        v = 1
    else
        v = 0
    for j ← 1 to k do
        m.append(v) // repeat mask value for a row
for n ← 1 to oc do
    em.extend(m)
rm ← reshape(em, ic, k)
return rm
```

FIG. 4B

Algorithm 2: Semi-structured random row-wise pruning with generated mask in algorithm 1

```
inputs : m = model, mp = array of generated mask for all layers
initialize : counter = 1, model_name = m.name
for layer in m.layers do
    threshold = get_threshold(model_name, counter)
    if threshold >= 0 then  // prune just specified layers
        mask = mp[counter]
        mask = mask.cuda()
        weight = get_weight_matrix(layer)
        weight = apply_matrix_multiplication(mask, weight)
        update_weight(layer, weight)
    counter = counter + 1
```

FIG. 6

Algorithm 3 : Model training with proposed pruning method in algorithm 2

```
Inputs : nb_epochs = number of training epochs, m = model, train_loader = train data set
Initialize : counter = 1, model_name = m.name, mask_array=[]
for layer in m.layers do
    seed = get_randomizer_seed(model_name, counter)
    threshold = get_threshold(model_name, counter)
    k = get_kernel_size(layer)
    ic = get_input_channel_number(layer)
    oc = get_output_channel_number(layer)
    mask = call_generate_random_mask_LFSR(seed, threshold, k, ic, oc) // Algorithm 1
    mask_array[counter] = mask
    counter = counter + 1 for epoch = 0 to nb_epochs do
    for b = 0 to nb_batchs do
        If (b != 0) or (b == 0 and epoch == 0) then
            call_semi_structured_random_row_wise_pruning(m, mask_array) // Prune before forward propagation
        call_forward_propagation(train_loader)
        call_backward_propagation()
        call_update_parameters()
        call_optimizer()
    call_semi_structured_random_row_wise_pruning(m, mask_array) // Prune at the end of training process
    call_validation()
```

FIG. 7

Algorithm 4 : Proposed Method - Inference side

```
Inputs :
thread_index = The index of the thread which runs the corresponding filter
y_dim = Dimension of the layer output
in_channel = Dimension of the input channel
kernel_dim = Dimension of the filter kernel
lfsr_initial_seed = seed for LFSR
Initialize : psum = 0
for k in thread_index do
    for yh in y_dim do
        lfsr_state=lfsr_initial_seed
        psum[]=0
        for c in in_channel do
            for rh in kernel_dim do
                if lfsr_state > pruning_threshold do
                    // row-wise convolution
                    calculate (filter_index)
                    calculate (input_index)
                    calculate (psum_index)
                    psum[psum_index] + = x_row[input_index] * filter_row[filter_index]
                lfsr_state=lfsr_func(lfsr_state)
        calculate (output_index)
        y[output_index] = psum (psum_index) + bias(k)
```

FIG. 8

METHODS, SYSTEMS, AND MEDIA FOR RANDOM SEMI-STRUCTURED ROW-WISE PRUNING IN NEURAL NETWORKS

FIELD

The present disclosure relates to artificial neural networks, including deep learning neural networks and training thereof.

BACKGROUND

Artificial neural networks are computational structures used to create and apply models for performing inference tasks. A neural network typically includes multiple layers of neurons, each neuron receiving inputs from a previous layer, applying a set of weights to the inputs, and combining these weighted inputs to generate an output, which is in turn provided as input to one or more neurons of a subsequent layer.

A layer of neurons uses filters to define the relationship between the outputs of the neurons of the previous layer and the outputs of the neurons of the current layer. A layer of the neural network receives a data input, usually in the form of a data array of known dimensions: in the case of neural networks operating on 2D data such as image data, the data input to a layer of the network is generally a 3D array consisting of a set of multiple 2D input activation maps (also called input feature maps or input channels). By applying the set of filters to the set of input activation maps, the layer generates a data output, which is typically a data array having known dimensions: again, in the case of neural networks operating on 2D data, the data output of a layer of the network is generally a 3D array consisting of a set of multiple 2D output activation maps (also called output feature maps or output channels).

A filter comprises a set of weights (also called parameters). In some neural networks, such as convolutional neural networks (CNNs), the weights of a filter are arranged into convolution kernels, such as 2D convolution kernels. Each kernel of a filter corresponding to a channel of the data input (i.e. an input activation map). The application of a single filter to the input volume (e.g. by convolving the kernels of the filter with the corresponding input activation maps of the data input) generates a single output activation map. The set of output activation maps generated by the set of filter of the convolution layer are the data output of the convolution layer.

Training a neural network involves learning the appropriate weight values at different weight locations throughout the network. After being optimally trained to perform a given inference task, the weights of the neural network will not all contribute equally to the final inference outputs: some weights will have high value due to their high contribution, while other weights will have low value due to their low contribution. If the network is are properly trained (e.g., high value weights are misplaced or miscalibrated by training), then the trained network will perform with less accuracy.

Some neural networks, such as convolutional neural networks, may be large (i.e. have a large number of weights and/or individual weights represented by a large number of bits) and deep (i.e. include many hidden layers) in order to achieve high performance at inference for a specific task, such as object detection, object localization, or object classification. However, these large, deep neural networks may require large amounts of memory and/or computational resources, presenting challenges to their deployment on certain computing devices, such as smart phones. These challenges include energy and power consumption, latency, storage and memory bandwidth.

Large neural networks tend to require more computing resources to store and execute, which may constrain the types of platforms that can feasibly operate them. It is therefore desirable to reduce the size of a neural network through some combination of reducing the number of weights included in the neural network and reducing the number of bits required to represent each of the neural network's individual weights, insofar as such a reduction in neural network size does not result in an unacceptable loss of performance. In order to reduce the size of neural networks to enable their deployment on devices or platforms having memory, processing, or power constraints, several model compression methods have been proposed. Low-bits quantization reduces the size of the neural network by decreasing the precision of the weights defining the relationship between the neurons of the neural network. Low-rank matrix approximation approximates the matrix of weights using lower rank matrices. Network pruning removes insignificant weights to reduce the network size.

Network pruning approaches fall into two general types: structured and unstructured. Structured pruning usually involves removing entire sets of weights, such as entire filters, based on the degree of contribution of those filters to the final inferred (i.e. predicted) output of the neural network. Structured network pruning approaches include network slimming and soft filter pruning. Structured pruning approaches have shown some effectiveness in reducing the size of the neural network, thereby reducing the memory required to store the weights of the neural network and speeding up the calculations involved in inference tasks. However, they have not been shown to achieve high rates of model compression while maintaining high levels of accuracy.

Unstructured network pruning, in contrast, removes individual weights that are deemed to be low-value. These approaches can potentially achieve high compression while maintaining high accuracy, and the compression enables faster inference times. However, they do not substantially reduce memory requirements for storing the weights of the trained neural network or for the number of memory accesses required while performing inference, as a record identifying the indices of the non-pruned weights must be maintained in memory and referenced during inference.

Thus, there exists a problem: existing model compression approaches to neural networks currently do not reduce memory requirements and speed up inference time while still maintaining high accuracy at high levels of compression.

SUMMARY

In various examples, the present disclosure describes methods, systems, and computer-readable media for random semi-structured row-wise pruning of a neural network, and in particular a convolutional neural network, to reduce the number of parameters of the trained neural network. Instead of pruning entire filters from the neural network as in structured pruning approaches or pruning individual weights from the neural network as in unstructured pruning approaches, the methods, systems, and computer-readable media of the present disclosure prune rows of weights from individual kernels. This approach can be regarded as semi-structured pruning, and may in some embodiments exhibit the strengths of both structured and unstructured pruning approaches. In example embodiments described herein, performance of a neural network, and in particular a convolutional neural network, trained and/or operated in inference mode in accordance with the present disclosure may be improved, including decreased memory access requirements and/or decreased inference time, without a significant loss of accuracy.

The methods described herein may be used in computer vision applications such as image classification, object recognition including object detection, object localization, object classification, sematic segmentation, and the like. In addition, they may provide advantages for large trained neural networks used for natural language processing and speech recognition, where the trained neural network has a large number of parameters and computations. The methods may enable the deployment of large trained neural networks on computationally-limited devices such as cellphones, embedded devices, robotics, drones, cameras, Internet of Thing (IoT) sensors, and IoT devices.

In some aspects, the present disclosure describes a method for pruning filters of a convolutional layer of a convolutional neural network. A pruning threshold indicating a desired compression ratio for the convolutional layer of the convolutional neural network is received. A seed value is provided to a pseudo-random number generator. A row pruning mask identifying a plurality of kernel rows of a filter of the convolutional layer to be pruned is generated. The row pruning mask is generated by generating, using the pseudo-random number generator, a sequence of pseudo-random random numbers based on the seed value, and for each kernel row of a first filter of the convolutional layer, determining whether to identify the kernel row of the first filter as one of the plurality of kernel rows to be pruned based on a comparison the pseudo-random number to the pruning threshold. A pruned filter is then generated in accordance with the generated row pruning mask and the first filter, the pruned filter comprising at least the kernel rows of the first filter not identified as kernel rows to be pruned In accordance with the preceding aspect, the method includes for each additional filter of a plurality of additional filters of the convolutional layer, generating an additional pruned filter in accordance with the generated row pruning mask and the additional filter, each additional pruned filter comprising a plurality of kernel rows of the additional filter at positions within the additional filter corresponding to positions of the kernel rows of the first filter not identified as kernel rows to be pruned.

In accordance with any of the preceding aspects, the method includes for each additional filter of a plurality of additional filters of the convolutional layer: generating an additional row pruning mask identifying a plurality of kernel rows of an additional filter of the convolutional layer to be pruned and generating an additional pruned filter in accordance with the additional filter and the additional row pruning mask, the additional pruned filter comprising at least the kernel rows of the additional filter not identified as kernel rows to be pruned. Generating an additional row pruning mask comprises: generating, using the pseudo-random number generator, an additional pseudo-random number sequence based on the seed value; and for each kernel row of the additional filter of the convolutional layer, determining whether to identify the kernel row of the additional filter as one of the plurality of kernel rows to be pruned based on a comparison of the pseudo-random number to the pruning threshold.

In accordance with any of the preceding aspects, the pseudo-random number generator is a Linear Feedback Shift Register.

In accordance with any of the preceding aspects, each kernel row of the first filter comprises a plurality of weight values, wherein generating the row pruning mask further comprises setting the weight values of each kernel row to be pruned to zero.

In accordance with at least some of the preceding aspects, the method further includes receiving one or more input activation maps at the convolutional layer and generating, at the convolutional layer, a plurality of output activation maps by convolving the kernel rows of the pruned filter and the kernel rows of the additional pruned filters with each of the one or more input activation maps.

In accordance with at least some of the preceding aspects, the method further includes for each of one or more additional convolutional layers of the convolutional neural network: generating a row pruning mask identifying a plurality of kernel rows to be pruned from a first filter of the additional convolutional layer and generating a pruned filter in accordance with the generated row pruning mask and the first filter, the pruned filter comprising at least the kernel rows of the first filter not identified as kernel rows to be pruned. The row pruning mask is generated by: generating, using the pseudo-random number generator, a sequence of pseudo-random numbers sequence based on the seed value; and for each kernel row of a first filter of the convolutional layer, determining whether to identify the kernel row of the first filter as one of the plurality of kernel rows to be pruned based on the pseudo-random number to the pruning threshold.

In accordance with at least some of the preceding aspects, the method further includes training the convolutional neural network in accordance with training data of a training data set, the pruned filter, and the additional pruned filters to update parameters of the convolutional neural network. The method further includes validating the convolutional neural network in accordance with validation data of the training data set, the pruned filter to determine an accuracy of the convolutional neural network for the seed value.

In accordance with the preceding aspect, providing the seed value, generating the row pruning mask, generating the pruned filter, generating the additional pruned filters, training the convolutional neural network, and validating the convolutional neural network are included in a first trial, and the method further includes performing one or more additional trials. Each additional trial includes: initializing parameters of the convolutional neural network, and repeating providing a seed value, generating the row pruning mask for the convolutional layer and the additional convolutional layers, generating the pruned filters for the convolutional layer, generating the additional pruned filters for each additional convolutional layer, re-training the convolutional neural network in accordance with the training data of the training data set, the pruned filters and the additional pruned filters, and validating the convolutional neural network in accordance with the validation data of the training data set to determine the accuracy of the convolutional neural network, wherein a separate seed value is used for each trial; and selecting an optimal seed value from the seed values used for each trial based on the accuracy of the convolutional neural network determined for each seed value.

In accordance with at least some of the preceding aspects, convolving the kernel rows of the pruned filter and the kernel rows of the additional pruned filters with each of the one or more input activation maps comprises performing row-wise convolution of the pruned filter and each additional pruned filter with the one or more input activation map. Performing row-wise convolution includes providing each kernel row of each pruned filter to one or more computing units, each computing unit comprising a number of multiply-and-accumulate units equal to the number of weights in each kernel row, providing the input activation maps to the computing units; and using the multiply-and-accumulate units of each of the computing units to convolve the kernel rows with respective input activation maps to generate a plurality of partial convolution results, and accumulating the partial convolution results to generate the plurality of output activation maps.

In accordance with the preceding aspect, the one or more computing units comprises a number of computing units equal to a value U. Providing each kernel row to the computing units comprises providing a kernel row sequence of kernel rows to the U computing units, the kernel row sequence comprising a sequence of data sets, each data set comprising U kernel rows, each kernel row of a given data set being provided as a first data input to a respective computing unit. Providing the input activation maps to the computing units comprises providing a channel sequence of input activation maps to the computing units, each input activation map in the channel sequence being provided as a second data input to the computing units while a corresponding one or more data sets of the kernel row sequence are being sequentially provided as the first data input to the computing units. The U kernel rows in any given data set are all from an identical position within each of U pruned filters.

In accordance with the preceding aspect, U is equal to the number of filters in the convolutional layer.

According to a further aspect, the present disclosure describes a system. The system includes a processor and a memory storing instructions. The instructions, when executed by the processor device, cause the system to perform any of the methods described herein.

According to a further aspect, the present disclosure describes a computer-readable medium having instructions tangibly stored thereon. The instructions, when executed by a processing unit, cause the processing unit to perform any of the methods described herein.

BRIEF DESCRIPTION OF THE DRAWINGS

Reference will now be made, by way of example, to the accompanying drawings which show example embodiments of the present application, and in which:

FIG. 4B is a segment of pseudo-code showing an example implementation of the method of FIG. 4A, in accordance with the present disclosure;

FIG. 6 is a segment of pseudo-code showing an example method for applying the semi-structured row-wise pruning mask of FIG. 5, in accordance with the present disclosure;

FIG. 7 is a segment of pseudo-code showing an example method for training a neural network using the semi-structured row-wise pruning mask of FIGS. 5-6, in accordance with the present disclosure;

FIG. 8 is a segment of pseudo-code showing an example method for using the neural network trained in accordance with FIG. 4 or FIG. 7 to perform an inference task, in accordance with the present disclosure.

Similar reference numerals may have been used in different figures to denote similar components.

DESCRIPTION OF EXAMPLE EMBODIMENTS

Figure 1A:
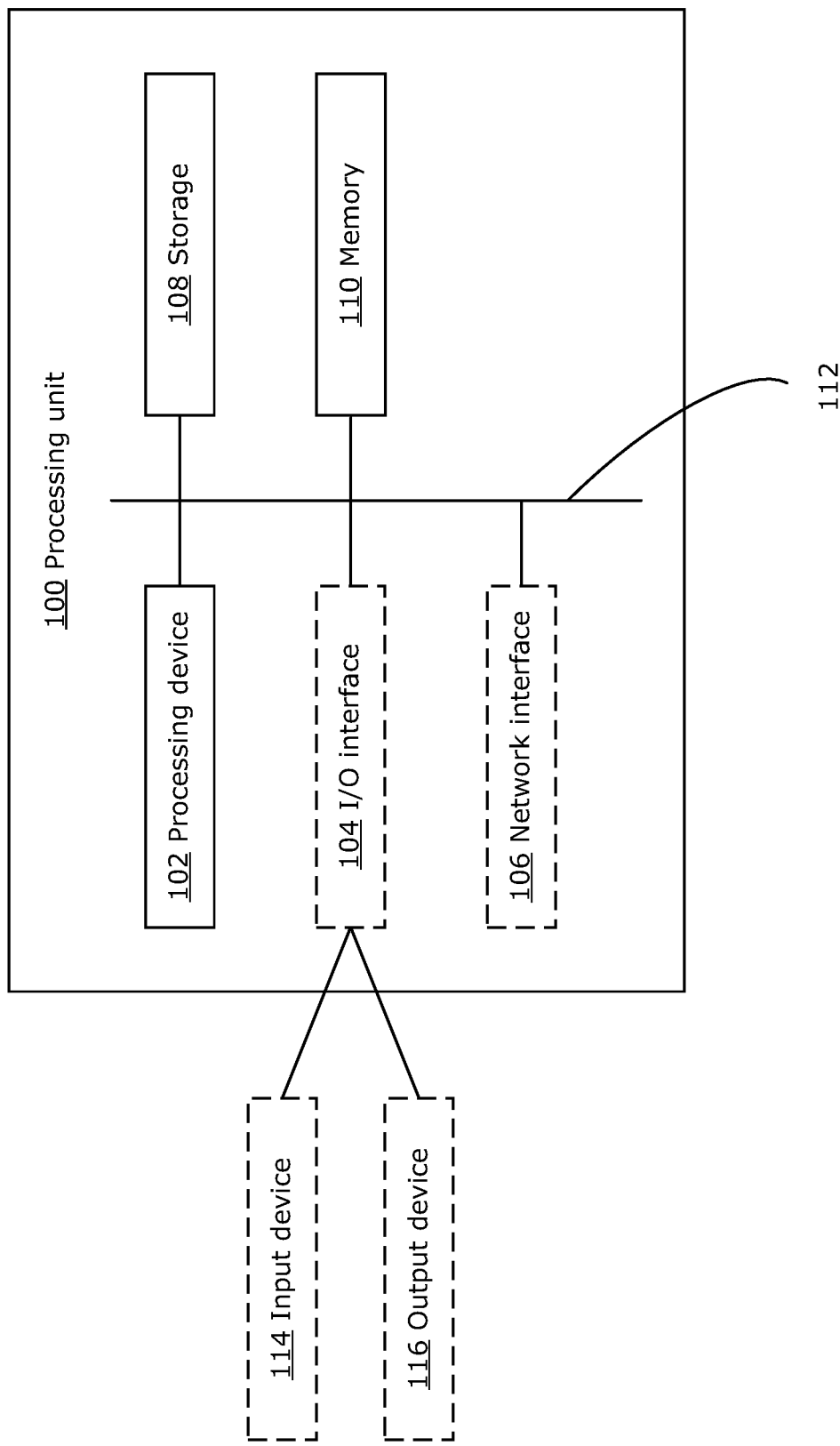
FIG. 1A is a block diagram of an example processing system that may be used to implement examples described herein.

Methods, systems, and computer-readable media for random semi-structured row-wise pruning during training of a neural network, and in particular a convolutional neural network, will now be described with reference to example embodiments. Instead of pruning entire filters from the network as in structured pruning approaches or pruning individual weights from the network as in unstructured pruning approaches, the present examples prune rows of weights from individual kernels. This approach can be regarded as semi-structured pruning, and may in some embodiments exhibit the strengths of both structured and unstructured pruning approaches. In examples described herein, performance of a trained convolutional neural network (CNN) that has been pruned during training in accordance with the method of the present disclosure may be improved, including decreased memory use and/or decreased inference time, without a significant loss of accuracy.

Example embodiments will be described herein with reference to deep convolutional neural networks (CNNs) that are trained using supervised learning for a particular interference task and, after being trained, the trained CNN is used to perform the particular inference task such as object classification using image data as inputs. However, it will be appreciated that the techniques described herein are potentially applicable to the training of a variety of artificial neural networks to perform a variety of inference tasks using supervised or unsupervised learning.

A CNN trained in accordance with examples disclosed herein may in some examples be implemented within a larger deep neural network. For simplicity, the present disclosure will refer to the CNN by itself, however it should be understood that the CNN may be part of a larger deep network, and training of the CNN may be part of training of the overall larger network architecture. Further, the present disclosure may use the term CNN to include a deep CNN.

Examples described herein may be applicable for training CNNs to perform various tasks including object classification, object detection, semantic segmentation, gesture recognition, action recognition, and other applications where CNNs may be used.

In deep CNNs, most of the computation time is spent on convolutional layers. In a convolutional layer, filters are convolved over inputs of the layer to generate outputs. In the examples described herein, the input of each layer consists of a three-dimensional matrix of values representing features, organized into a plurality of two-dimensional channels called input activation maps or input feature maps. The set of input activation maps to a layer has dimensions of $H_{in} \times W_{in} \times C_{in}$ where $H_{in}$ is the spatial height dimension of each input activation map, $W_{in}$ is the spatial width dimension of each input activation map, and $C_{in}$ is the number of input channels. Each layer has $C_{out}$ filters with the size of $h \times w \times c_{in}$ where h is the spatial height dimension of the filter and w is the spatial width dimension of the filter. Each element of the filter is called a weight. The weights of the filter are organized into kernels of dimensions h×w, with each kernel corresponding to an input channel. The convolved output of a single filter of the convolution layer is known as an output feature map with size $H_{out} \times w_{out}$ where $H_{out}$ is the spatial height dimension of the output activation map and $w_{out}$ is the spatial width dimension of the output activation map. The output of the entire set of $C_{out}$ filters of the convolution layer is therefore a set of output activation maps with overall size $H_{out} \times w_{out} \times C_{out}$, where $C_{out}$ is the number of output channels. To perform the convolution operations of the layer, each filter strides over the set of input activation maps and computes the dot products between filter weights and the corresponding input features. Each computed dot product of the filter with a single filter-sized portion of the set of input activation maps (i.e. a region of the set of input activation maps of dimensions $h \times w \times c_{in}$) corresponds to a single value in a single channel of the output activation map. At the level of individual kernels of the filter, a dot product is computed for each kernel with the corresponding portion of its corresponding input channel to generate partial result, and the partial result from each kernel is summed with the partial result from each other kernel to generate a single output activation value of the output activation map. By computing further output activation values as the kernels traverse the height and width of the input activation maps, an output activation map is generated. This process is then repeated using each additional filter in the layer to generate an additional output activation map.

Performing convolution operations requires a large amount of data transfer from external memory to computational units, computing many dot-products, and storing many partial results in memory. However, some computing devices have limited computational power and resources. This may prevent the implementation of the whole convolutional layers in a single hardware device. Instead, some embodiments may use an accelerator in a sequential manner to perform the convolution computation of each layer one by one. In other words, the accelerator receives the input activation maps of a layer L and, by convolving them with the filters of that layer, generates the output activation maps. The generated output activation maps are then fed to the accelerator as the input activation maps of the next layer, i.e. layer L+1, and the accelerator generates the output activation maps of that layer. This process is repeated in sequence for all the convolutional layers. In some embodiments, because of more severe constraints in area and power consumption, the accelerator cannot even compute the entire output activation map of one layer. Therefore, the accelerator is used several times, each time generating one part or one subset of the output activation maps of a layer. The architecture of the neural network, defined by various hyperparameter values (also called "configuration values" herein) (e.g., kernel size, input activation map size, and the number of kernels) may change across layers. Handling all these variations using a fixed hardware device may require efficient computation patterns.

A system that may be used in examples disclosed herein is first described.

FIG. 1A a block diagram of an example simplified processing device 100, which may be a device that is used to train a convolutional neural network in accordance with examples disclosed herein or to execute the instructions of a trained neural network to perform the specific task for which the convolutional neural network has been trained (e.g. image classification, object recognition, etc.). Other processing devices suitable for implementing embodiments described in the present disclosure may be used, which may include components different from those discussed below. Although FIG. 1A shows a single instance of each component, there may be multiple instances of each component in the processing unit 100.

The processing device 100 may include one or more processing units 102, such as a central processing unit (CPU) with a hardware accelerator, a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof. The one or more processing units 102 may also include a plurality of hardware computing units (CUs) as described in detail below with reference to FIGS. 2D and 3. Each computing unit may contain one or more Multiply-Accumulate (MAC) units. In some embodiments, each computing unit may include a number of MAC units equal to the kernel width of each kernel of the filters of a layer of the neural network, to optimize the parallel operation of a pipeline for row-wise computation of output activation maps of the layer, as described below with reference to FIGS. 2D and 3.

The processing device 100 may also include one or more optional input/output (I/O) interfaces 104, which may enable interfacing with one or more optional input devices 114 and/or optional output devices 116. In the example shown, the input device(s) 114 (e.g., a keyboard, a mouse, a microphone, a touchscreen, and/or a keypad) and output device(s) 116 (e.g., a display, a speaker and/or a printer) are shown as optional and external to the processing unit 100. In other examples, one or more of the input device(s) 1914 and/or the output device(s) 116 may be included as a component of the processing unit 100. In other examples, there may not be any input device(s) 114 and output device(s) 116, in which case the I/O interface(s) 104 may not be needed.

The processing device 100 may include one or more optional network interfaces 106 for wired or wireless communication with a network (e.g., an intranet, the Internet, a P2P network, a WAN and/or a LAN) or other node. The network interfaces 106 may include wired links (e.g., Ethernet cable) and/or wireless links (e.g., one or more antennas) for intra-network and/or inter-network communications.

The processing device 100 may also include one or more storage units 108, which may include a mass storage unit such as a solid state drive, a hard disk drive, a magnetic disk drive and/or an optical disk drive. The processing device 100 may include one or more memories 110, which may include a volatile or non-volatile memory (e.g., a flash memory, a random access memory (RAM), and/or a read-only memory (ROM)). The non-transitory memory(ies) 110 may store instructions for execution by the processing device(s) 102, such as to carry out examples described in the present disclosure. The memory(ies) 110 may include other software instructions, such as for implementing an operating system and other applications/functions. In some examples, memory 110 may include software instructions for execution by the processing device 102 to train a neural network and/or to implement a trained neural network, as disclosed herein.

In some other examples, one or more data sets and/or modules may be provided by an external memory (e.g., an external drive in wired or wireless communication with the processing unit 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 112 providing communication among components of the processing unit 100, including the processing device(s) 102, optional I/O interface(s) 104, optional network interface(s) 106, storage unit(s) 108 and/or memory(ies) 110. The bus 112 may be any suitable bus architecture including, for example, a memory bus, a peripheral bus or a video bus.

Figure 1B:
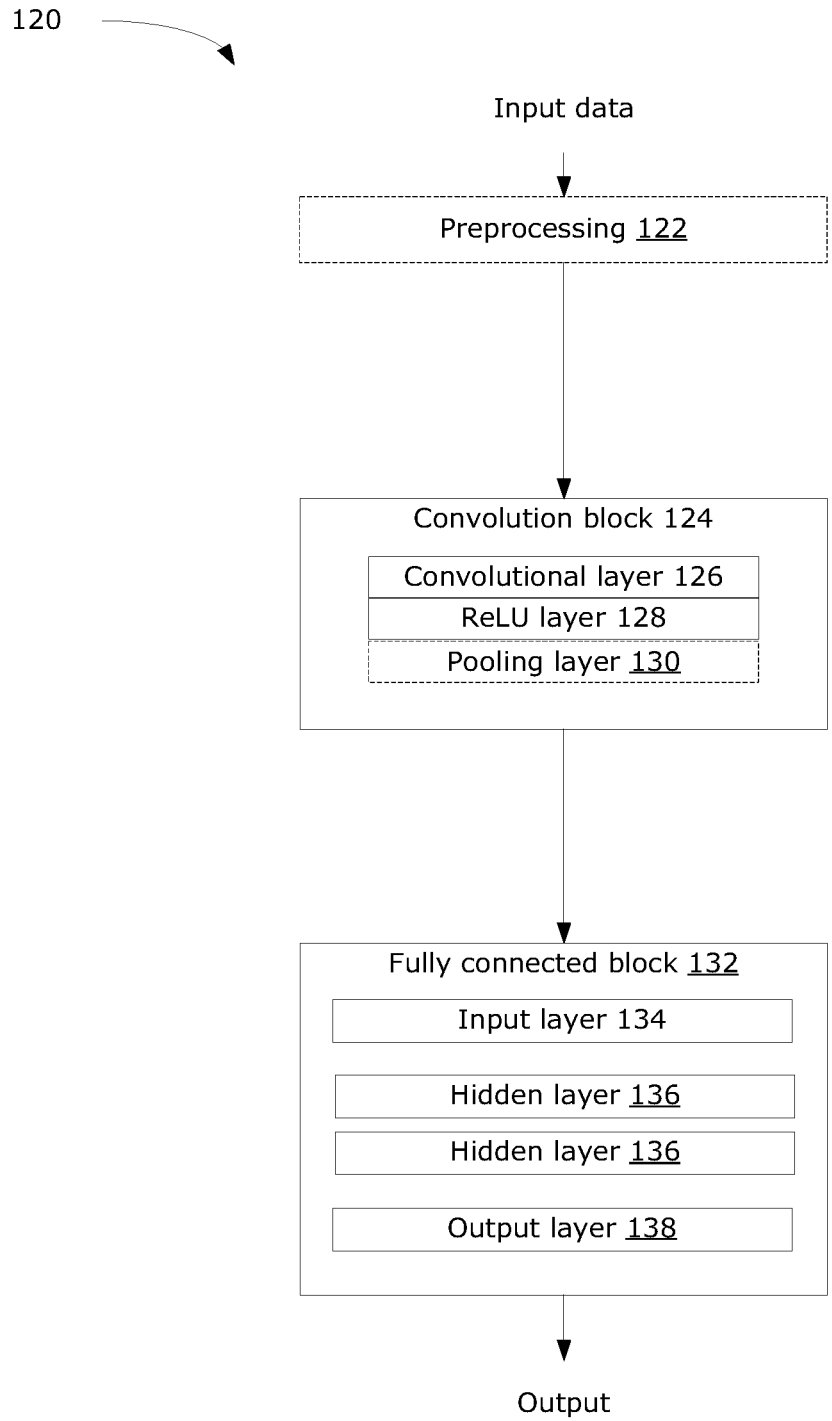
FIG. 1B is a schematic diagram of an example architecture for a CNN.

FIG. 1B illustrates an example architecture of a convolutional neural network (CNN) 120. The CNN 120 in this example is constructed and arranged for performing a specific task during training and inference, such as object detection, object recognition and classification (i.e. object localization and classification), audio recognition and classification, text recognition and classification, and the like. The CNN 120 has been simplified, is not intended to be limiting and is provided for the purpose of illustration only. The input data to the CNN 120 may be, for example, image data representing a digital image, audio data representing an audio file, or text data (i.e. an embedding representing a word or a sentence). Optional elements are shown in dashed lines.

The CNN 120 includes one or more convolution blocks 124 configured to perform feature learning, and a fully connected block 132 configured to perform a particular task. The CNN 120 may also optionally include a preprocessing block 122, which may perform various operations, such as normalization, to prepare the input data for a convolutional block 124.

The convolution block 124 shown in FIG. 1B may include, for example, include a convolutional layer 126, a combined non-linearity and rectification layer (e.g. ReLU layer 128) and an optional pooling layer 130. The output from each layer in the convolution block 124 is used as input to the next layer in the convolution block 124. In other words, an output from a convolutional layer 126 may be used as an input to a following ReLU layer 128, and the output of the ReLU layer 128 may be used as an input to a pooling layer 130, or may be used as an input to a convolutional layer 126 of another convolutional block 124, to continue a convolution operation.

The internal operating principles of a convolutional layer 126 are described in detail below with reference to FIGS. 1C, 2A and 2B. In summary, a convolutional layer 126 performs convolution operations on its input activations maps to generate an output that consists of output activation maps generated from the input activation maps.

Because a quantity of parameters (e.g. weights) of filters of a convolutional layer 126 usually needs to be reduced, a pooling layer 130 may follow a convolutional layer 126 in a convolutional block 124. In an image processing process, a purpose of the pooling layer 130 is to reduce a size of the output activation maps generated by ReLU layer 128. The pooling layer 130 may include an average pooling operator and/or a maximum pooling operator, to perform sampling on the input activation maps to obtain the output activation maps of a relatively small size. The average pooling operator may compute a pixel value in the activation map within a specific range, to generate an average value as an average pooling result. The maximum pooling operator may obtain, as a maximum pooling result, a pixel with a largest value within the specific range. The size of the activation map output after processing by the pooling layer may be smaller than a size of the activation map input to the pooling layer. Each pixel in the activation map output by the pooling layer indicates an average value or a maximum value of a subarea corresponding to the activation map input to the pooling layer.

After the input data is processed by the convolution block 124, the CNN 120 is still incapable of outputting desired output information. To generate final output information (e.g., object category (i.e. class), bounding box, etc.), a fully connected block 132 of the CNN 120 generates an output from the output of the convolution block 124. The output of the convolution block 124 is output activation maps as described above.

The fully connected block 132 includes an input layer 134, one or more hidden layers 136, and an output layer 138. The output layer 138 follows the last hidden layer 136 of the fully connected block 132. In other words, the output layer 138 is a final layer in the entire CNN 120. During training of the CNN 120, training data and a supervised learning algorithm are used to train the CNN 120. After forward propagation (propagation in a direction from 124 to 138 in FIG. 2 is forward propagation) is complete a loss function similar to category (i.e. class) cross-entropy is used to compute a prediction error of the CNN 120, and back propagation (propagation in a direction from 138 to 124 in FIG. 2 is back propagation) is performed to update the parameters (e.g. weights) of the layers 128, 130, 132, 134, 136, and 128 of the CNN 120 based on the computed prediction error to reduce the prediction error between an ideal result (i.e. the ground truth in the training data) and the prediction result output by the output layer 138.

It should be noted that the CNN 120 shown in FIG. 1B is merely used as an example architecture of a convolutional neural network. In actual application, the architecture of the CNN 120 may exist in a form.

The above discussion provides an example that illustrates how a trained CNN may be used for performing a specific task during inference. In general the input data may have one, two or three (or more) dimensions, and the output may have any suitable format, depending on the task. The example embodiments herein shall be described in the context of a CNN that used to perform a particular task, such as object detection, object localization and classification. In the example embodiments described herein, the input to the CNN 120 is an image that may be pre-processed by and fed to the input layer, receiving input activation maps and generating output activation maps in the form of multi-channel 2D pixel arrays (i.e., 3D arrays defined by a pixel height, a pixel width, and a channel depth). However, it will be appreciated that data arrays of different dimensionality may be used as input or output in some embodiments, such as multi-channel 1D arrays for tasks involving e.g. audio or text inputs.

Figure 1C:
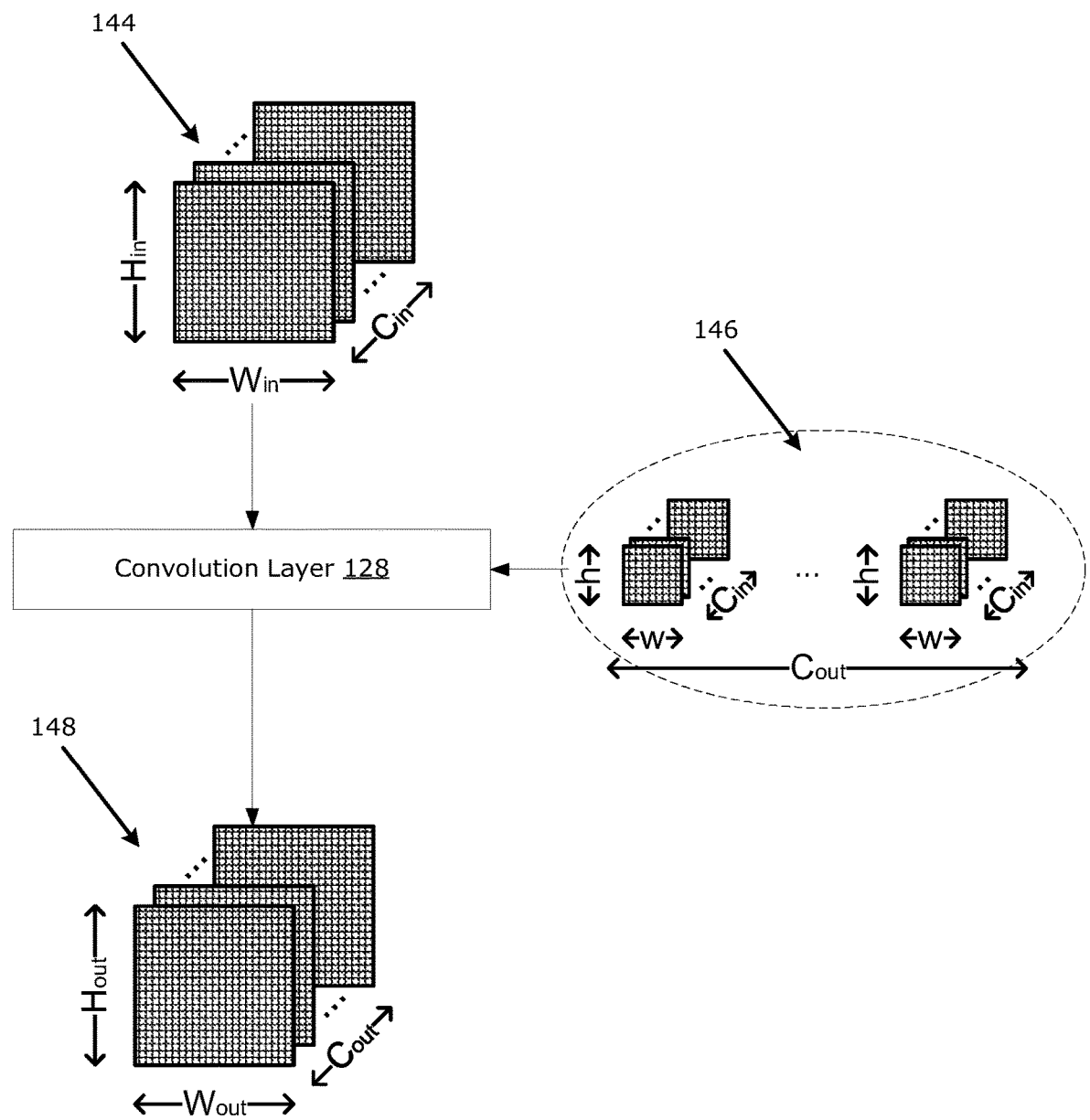
FIG. 1C is a schematic diagram of a convolution layer of the CNN of FIG. 1B showing the dimensions of an input data array, an output data array, and a set of convolution filters applied by the convolution layer.
Figure 2A:
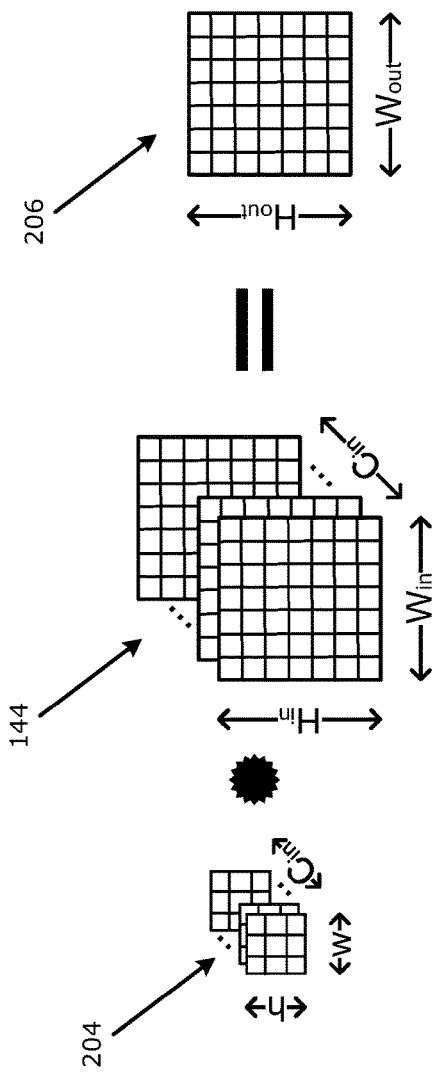
FIG. 2A is a schematic diagram of an example convolution operation of a single filter of a convolutional layer of the CNN of FIG. 1B with a set of input activation maps to generate an output activation map.

FIG. 1C illustrates a convolutional layer 130, showing the dimensions of an input data array 144, an output data array 148, and a set of convolution filters 146 applied by the convolution layer 142. The input data array 142 is shown here as a multi-channel set of activation maps having a number of input channels (i.e. activation maps) equal to value Cm. Each channel of the input data array 144 consists of a 2D array, such as an image consisting of a 2D pixel array, having a height $H_{in}$ and a width $W_{in}$. Thus, the number of values stored in the input data array 142 is equal to ($H_{in} \times W_{in} \times C_{in}$). The convolution filters 146 applied to the input data array 144 each have a height h, a width w, and a channel depth $C_{in}$. The convolution layer 142 uses a number of convolution filters 146 equal to value $C_{out}$.

The convolutional layer 130 applies the convolution filters 146 to the input data array 144 in a series of convolution operations. Each convolution filter 146 is applied to the input data array 144 to generate a channel of the output data array 148, shown here as a multi-channel set of activation maps having a number of output channels (i.e. output activation maps) equal to value $C_{out}$. Each channel of the output data array 148 consists of a 2D array, such as an image consisting of a 2D pixel array, having a height $H_{out}$ and a width $W_{out}$. The relationships between $H_{in}$ and $H_{out}$, and between $W_{in}$ and $W_{out}$, are determined by the kernel dimensions h and w and the stride, padding, and other convolution configuration values or hyper-parameters used by the convolution operations of the convolution layer 142. In some embodiments, $H_{in}=H_{out}$ and $W_{in}=W_{out}$. For example, an example embodiment may use kernel dimensions h=3 and w=3, with padding of 1 pixel and stride 1, to generate an output data array wherein $H_{in}=H_{out}$ and $W_{in}=W_{out}$. The use of a convolution layer 142 wherein $H_{in}=H_{out}$ and $W_{in}=W_{out}$ may present certain advantages, for example in embodiments using hardware or software components optimized to process input channels having fixed dimensions.

Row-Wise Convolution

As described above, a convolution layer applies a set of convolution filters to the set of input activation maps to generate the set of output activation maps. FIG. 2A shows an example convolution operation of a single filter 204 of a convolution layer. The filter 204, having dimensions h×w× $C_{in}$, traverses the height and depth of the set of input activation maps 144 of dimensions ($H_{in} \times W_{in} \times C_{in}$), performing a convolution operation with pre-defined hyper-parameter values (e.g. stride and padding values). Each computed dot product of the kernel with a single filter-sized portion of the set of input activation maps (i.e. a region of the input activation maps of dimensions h×w×$C_{in}$) generates a single value in a single output channel 206. By computing further dot products as the filter kernels traverse the height and width of the set of input activation maps, a single output channel 206, with dimensions ($H_{out} \times W_{out}$), is generated.

Figure 2B:
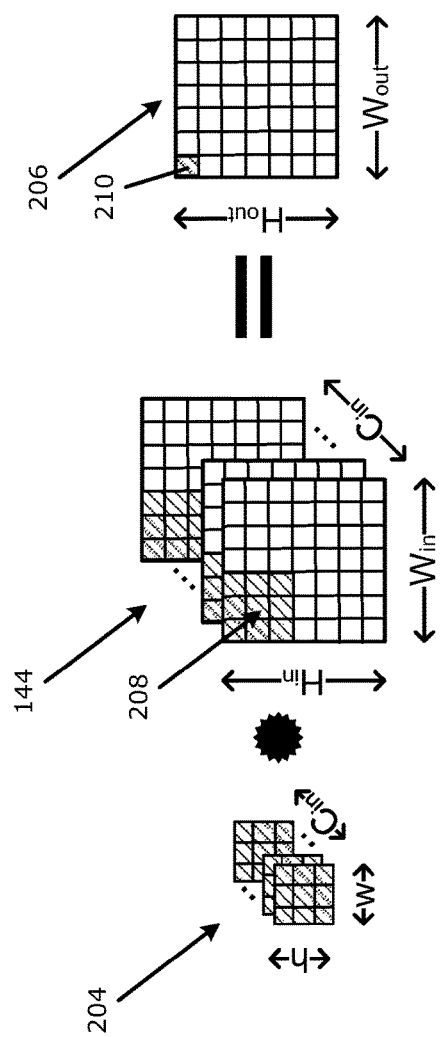
FIG. 2B is a schematic diagram of an example dot product operation of the single filter of FIG. 2A with a portion of the set of input activation maps of FIG. 2A to generate a single activation value of the output activation map of FIG. 2A.

FIG. 2B shows the filter 204 performing a single dot product computation on a single filter-sized portion 208 of the set of input activation maps 144 to generate a single output value 210 of the output channel 206. In this example, the convolution operation is performed with hyper-parameter values of padding=1, horizontal stride=1, and vertical stride=1, the kernel 204 has dimensions h=3 and w=3, $H_{in}=H_{out}+2$, and $W_{in}=W_{out}+2$. The input activation map 144 is shown with the padding already applied; its pre-padding size would have been ($H_{in}-2)\times(W_{in}-2$).

For each of the $C_{in}$ input activation maps, each of the nine weights of the corresponding kernel of the filter 204 is multiplied by a corresponding value in the corresponding input activation map (e.g., in the illustrated example, the weight value at the upper-left position of the first kernel of the filter is multiplied by the input value at the upper-left position of the first input activation map, and so on). Each of the products of these multiplication operations are added together to generate the single output value 210 of the output channel 206.

Figure 2C:
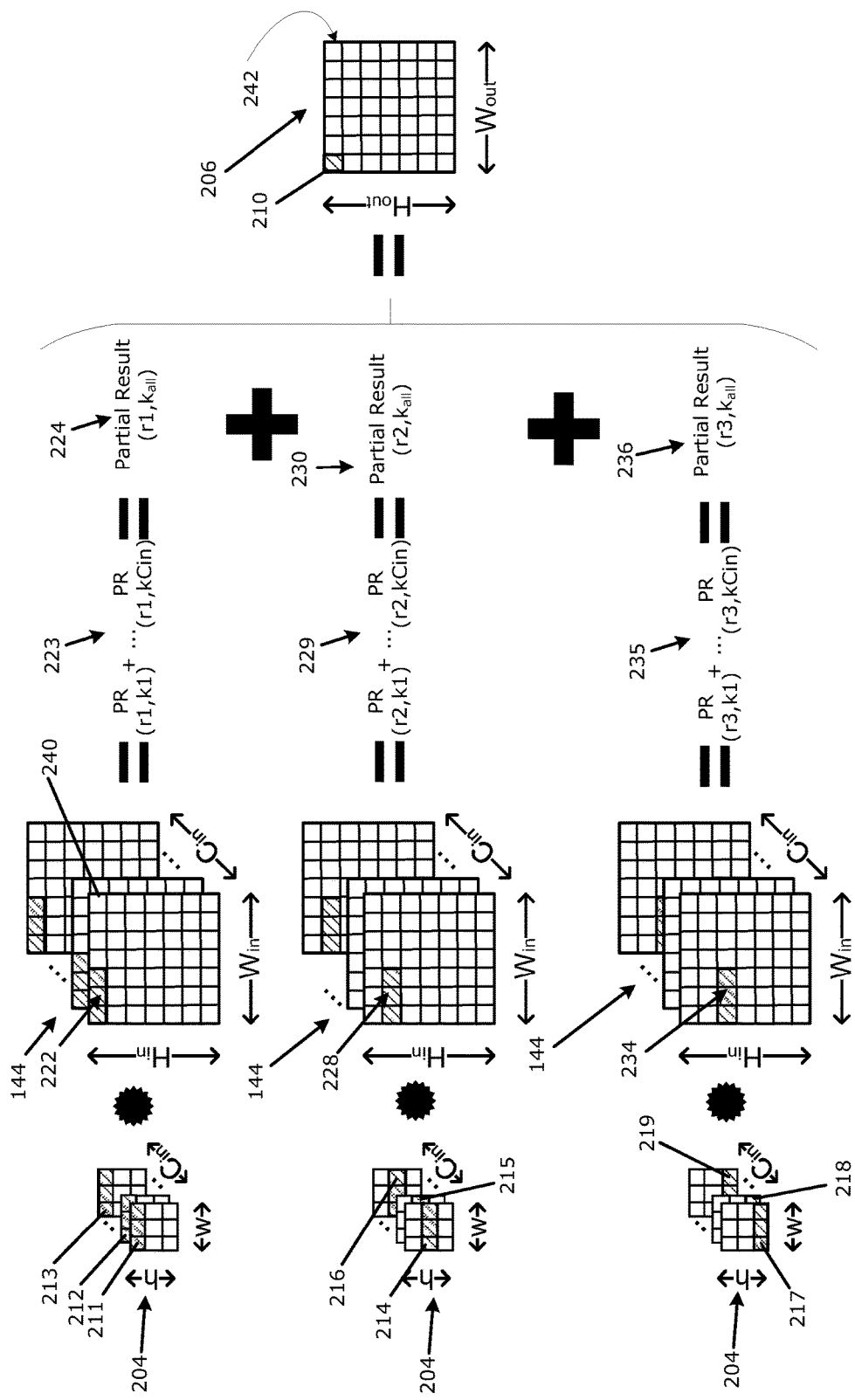
FIG. 2C is a schematic diagram of an example row-wise convolution operation of individual kernel rows of a filter of a convolution layer with corresponding portions of corresponding input activation maps to generate partial results that are combined to generate a single activation value of an output activation map.

One efficient way to perform convolution is to divide kernels into rows, convolve each row of the kernel (hereinafter referred to as a kernel row) with a corresponding part of the corresponding input activation map, and then accumulate the partial results. As used herein, the "position" of a kernel row within a filter means the row number and kernel number where the kernel row is located: for example, a kernel row may occupy the first row (sometimes referred to as "r1") of the third kernel (sometimes referred to as "k3") of a filter. FIG. 2C shows an example of row-wise convolution of a 3×3×$C_{in}$ filter 204 with a set of input activation maps 144 having $C_{in}$ input channels. At the beginning, the dot products of the set of first rows of each kernel (i.e. the first row of the first kernel 211, the first row of the second kernel 212, and so on through the first row of the kernel $C_{in}$ 213), having collective dimensions 1×3×$C_{in}$, and the corresponding 1×3×$C_{in}$ portion 222 of the set of input activation maps 144 are computed, generating a set of scalar partial results 223 (i.e. the dot products of the first row of the first kernel 211 with the first portion of the first input activation map, the first row of the second kernel with the first portion of the second input activation map, and so on). These partial results 223 are summed to generate a first scalar partial result 224 for the set of first kernel rows. This procedure is repeated for the set of second kernel rows (i.e. the second row of the first kernel 214, the second row of the second kernel 215, and so on through the second row of the kernel $C_{in}$ 216) and a second corresponding 1×3×$C_{in}$ portion 228 of the set of input feature maps 144 to generate another set of scalar partial results 229 (i.e. the set of dot products of the second row of each kernel with a corresponding portion of the corresponding input activation map), which are summed to generate a second scalar partial result 230 for the set of second kernel rows. It is then repeated a third time for the set of third rows of each kernel (i.e. the third row of the first kernel 217, the third row of the second kernel 218, and so on through the third row of the kernel $C_{in}$ 219) and a third corresponding 1×3×$C_{in}$ portion 234 of the set of input feature maps 144 to generate another set of scalar partial results 235, which are summed to generate a third scalar partial result 236 for the set of third kernel rows. By accumulating and summing the first, second and third scalar partial results 224, 230, 236, a single activation value 210 of the output channel 206 is generated. This procedure can be repeated by traversing the height and width dimensions of the set of input activation maps 144 with the filter 204 to generate the other values of the output channel 206. Additional filters of the convolution layer can then be applied to the input activation map 144 to generate the other output channels.

It will be appreciated that the order of the operations described above with reference to FIG. 2C can occur in a different order from the order in which they are described above. For example, the traversal of the set of input activation maps 144 by the filter 204 may be carried out one channel at a time, with the results of each channel added together after the last input channel has been traversed. In some embodiments, a row of a single kernel (such as the first row of the first channel 211) traverses a corresponding row of a single input channel (such as the first row 240 of the first input channel), generating a vector of dimensions (1×$W_{out}$). This process is repeated for the second and third rows of the kernel applied to the second and third rows, respectively, of the input channel. These three vectors are summed to generate a further vector of dimensions (1×$W_{out}$). This process is repeated for each additional kernel of the filter 204 and each input activation map to generate further vectors of dimensions (1×$W_{out}$). These further vectors are summed to generate a single row of the output channel 206 having dimensions (1×$W_{out}$) (e.g. first row 242 of the output channel 206). This process is repeated to generate each of the other rows of the output channel 206. The next filter in the network layer is then applied to the set of input activation maps 144 to generate the second output channel, and this continues until the entire set of output activation maps has been generated.

Figure 2D:
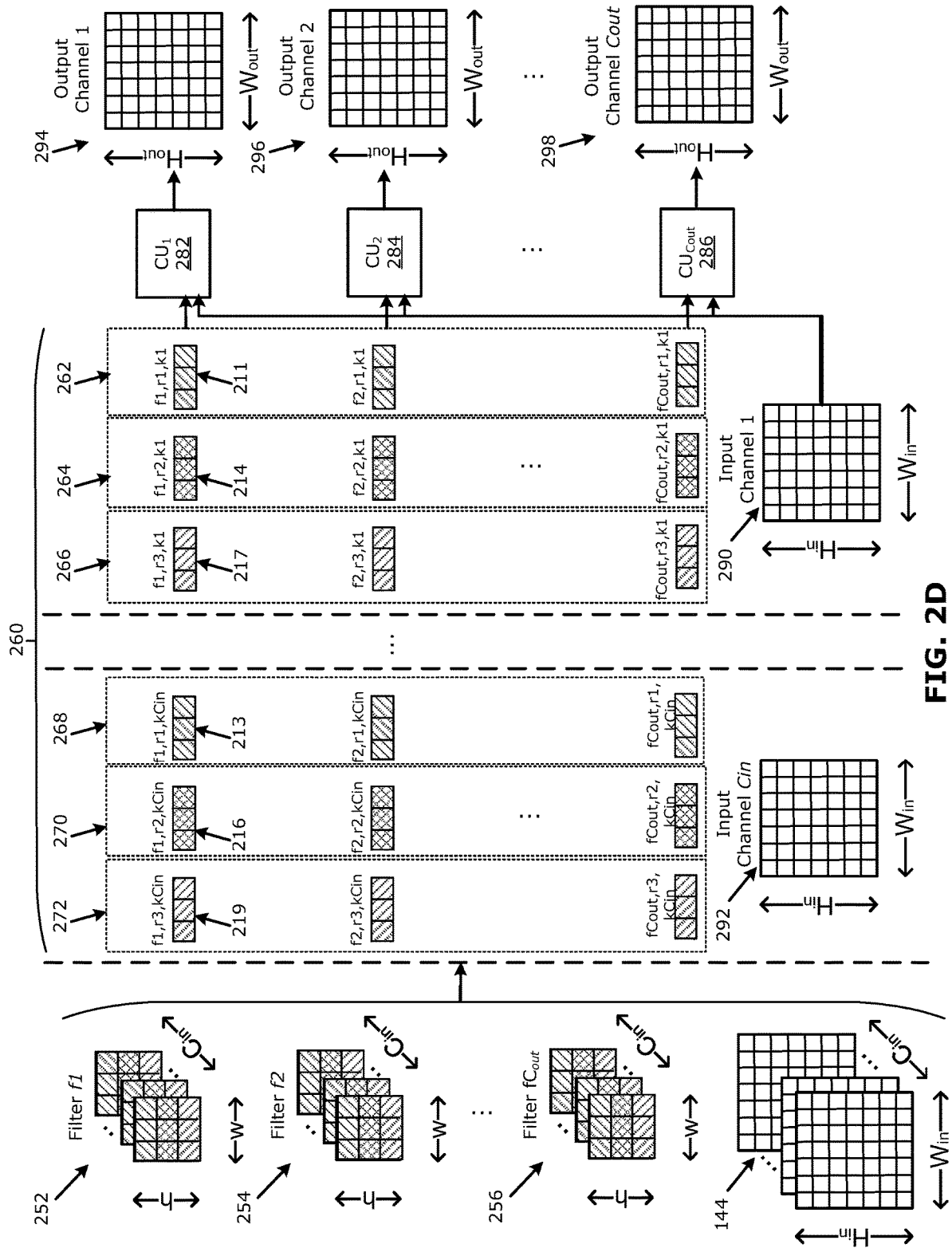
FIG. 2D is a schematic diagram of an example row-wise convolution operation performed by a set of convolution filters of a convolution layer using parallel hardware units and pipelined data inputs to the hardware units.

FIG. 2D shows an example of row-wise convolution using parallel hardware units and pipelined inputs. In some embodiments, the row-wise convolution in FIG. 2C can be implemented with hardware modules called computation units (CUs), each consisting of w Multiply-Accumulate (MAC) units (where w indicates the kernel width). Each CU receives kernel weights from a kernel and values of an input channel. In the illustrated example of FIG. 2D, a number of CUs equal to $C_{out}$ are used: a first CU ($CU_1$) 282, a second CU ($CU_2$) 284, and so on through a $C_{out}$-th CU ($CU_{Cout}$) 286. Each CU 282, 284, 286 includes three MACs: one to process each cell of a received row of three kernel weights.

The convolution layer consists of $C_{out}$ convolution filters: first filter f1 252, second filter f2 254, and so on through $C_{out}$-th filter f$C_{out}$ 256.

A data pipeline 260 is used to feed data inputs to the CUs 282 to 286. The CUs 282 to 286 are arranged in parallel, each CU receiving input from one of the filters 252 to 256 of the convolution layer as well as input from the set of input activation maps 144. The pipeline 260 has two parts: a kernel row sequence made up of a sequence of data sets, each data set being a plurality of kernel rows arranged in a number of parallel channels equal to the number of CUs; and a channel sequence made up of a sequence of input channels from the set of input activation maps 144.

A first data set 262 in the kernel row sequence of the pipeline 260 is the first to be processed by the CUs 282 to 286. The first data set 262 includes a set of kernel weights consisting of the first row of the first kernel 211 of each filter f1 252 through f$C_{out}$ 256. The row of weights from the first kernel of each filter 252 to 256 is provided as a first data input to each respective CU 282 to 286.

The first data set 262 is provided to the CUs via the kernel row sequence at the same time that a first input channel 290 of the set of input activation maps 144 is provided to the CUs via the channel sequence. The first input channel 290 is provided as a second data input to each CU 282 to 286.

Within each CU, the three MAC units are used to multiply and aggregate the products of the three weights of the kernel row received as the first data input with the input values of the input channel received as the second data input. The row of weights is convolved with the input channel, and the array of partial results is stored.

Thus, when the CUs 282 to 286 receive the first data set 262, each CU convolves its respective row of three weights (i.e. $CU_1$ 282 receives first row r1 of first kernel k1 of first filter f1 211, $CU_2$ 284 receives first row r1 of first kernel k1 of second filter f2, and so on through $CU_{Cout}$ 286 receiving first row r1 of first kernel k1 of $C_{out}$-th filter f$C_{out}$) with the first input channel 290 and stores the resulting matrix of partial results.

After first data set 262 has been processed by the CUs 282 to 286, a second data set 264 in the kernel row sequence is received by the CUs 282 to 286, followed by a third data set 266. The second data set 264 contains the second row r2 of the first kernel k1 of each filter in the layer, whereas the third data set 266 contains the third row r3 of the first kernel k1 of each filter. The first input channel 290 continues to be used as the second data input of each CU 282 to 286 while processing the second data set 264 and third data set 266, as the second and third kernel rows of the second and third data set, respectively, are located in the first kernel k1 corresponding to the first input channel 290.

This pattern of pipeline inputs is then repeated for the second kernel: a fourth data set (not shown) includes the first row r1 of the second kernel k2 of each filter, and the second input channel of the input activation map is provided as the second data input to the CUs. This patterns continues until the final kernel k$C_{in}$ is reached.

The final channel $C_{in}$ is provided to the CUs 282 to 286 by the channel sequence of the pipeline 260 in three final data sets 268, 270, 272 corresponding to the three rows of the final kernel of each filter. The final input channel $C_{in}$ 292 is provided as the second data input to each CU. Once the weights of the final kernels k$C_{in}$ have been convolved with the final input channel $C_{in}$ 292, the matrices of partial results stored by the CUs are added together or otherwise accumulated such that each CU 282 to 286 generates its respective output channel: $CU_1$ 282 generates first output channel 294, $CU_2$ 284 generates second output channel 296, and so on through $CU_{Cout}$ 286 generating final $C_{out}$-th output channel 298. The set of output channels 294 to 298 is then concatenated or otherwise accumulated to generate the set of output activation maps that constitute the output of the convolution layer.

In some embodiments, the stored matrices of partial values may be summed and re-stored as they are generated.

In some embodiments, the MACs of each CU perform the dot product operations and the generated partial results are stored in internal memories of the CU. The computation time for this step is proportional to the size of each output channel, i.e. $H_{out} \times W_{out}$. Some embodiments may have a larger number of kernels ($C_{out}$) than the number of parallel computing units: in some such embodiments, the procedure described above with respect to a single data set is repeated as many times as necessary to convolve all kernel rows with the input channels. Assuming the dimensions of each filter are h×w×$C_{in}$, then the total computation time T is:

$$T = C_{in} H_{in} W_{in} \frac{h \times w}{N} \left( \frac{C_{out}}{U} \right)$$

wherein U denotes the number of CUs and N denotes the number of MAC units per CU.

Random Semi-Structured Row-Wise Pruning

In various examples, the present disclosure describes a method for random semi-structured row-wise pruning of filters of convolutional layers of a CNN. The method may use the pipelined parallel row-wise convolution operation described with reference to FIG. 2D above; in some embodiments, this approach may speed up convolution time by eliminating pruned data sets from the pipeline 260 because an entire data set of corresponding kernel rows has been pruned from the kernels. By eliminating data sets from the pipeline, speed is increased, computing resources and power required to perform convolution is decreased, and memory requirements are potentially decreased due to the reduced number of partial results that need to be stored and accessed. Some embodiments may achieve high levels of compression through this technique while still exhibiting high levels of accuracy.

Row-wise pruning involves the pruning in units of one row of weights of a kernel (referred to herein as a kernel row) of a filter. It can therefore be regarded as an intermediate approach between pruning individual weights in unstructured pruning and the pruning of entire filters in structured pruning. In some embodiments described herein, the same set of kernel rows is pruned form each filter of a convolution layer of the CNN 120 by applying a single row pruning mask to each filter. This results in a set of uniformly-pruned filters: thus, it may be regarded as a semi-structured pruning approach.

The selection of kernel rows to prune from the kernels of filters may be carried out in various ways. In the examples described herein, the selection of rows to prune from the kernels of filters or rows to not prune from the kernels of filters is determined randomly, but in other embodiments the rows to prune from the kernels of a filter may be selected systematically based on pre-existing criteria. In some embodiments, the number of rows to be pruned from the kernels of a filter is determined according to a hyper-parameter value that is set prior to training of the convolutional neural network. Based on the row selection criteria and the number of rows to be pruned from the kernels of a filter, a row pruning mask may be generated that prunes a subset of rows of the kernels of each filter of the convolution layer. Mathematically, this is the equivalent of setting each weight in the pruned rows to zero; however, in the examples described herein, it means that any set of computations involving only multiplication and addition of these weight values can be omitted while arriving at the same mathematical outcome as if the weights had been set to zero.

Figure 3:
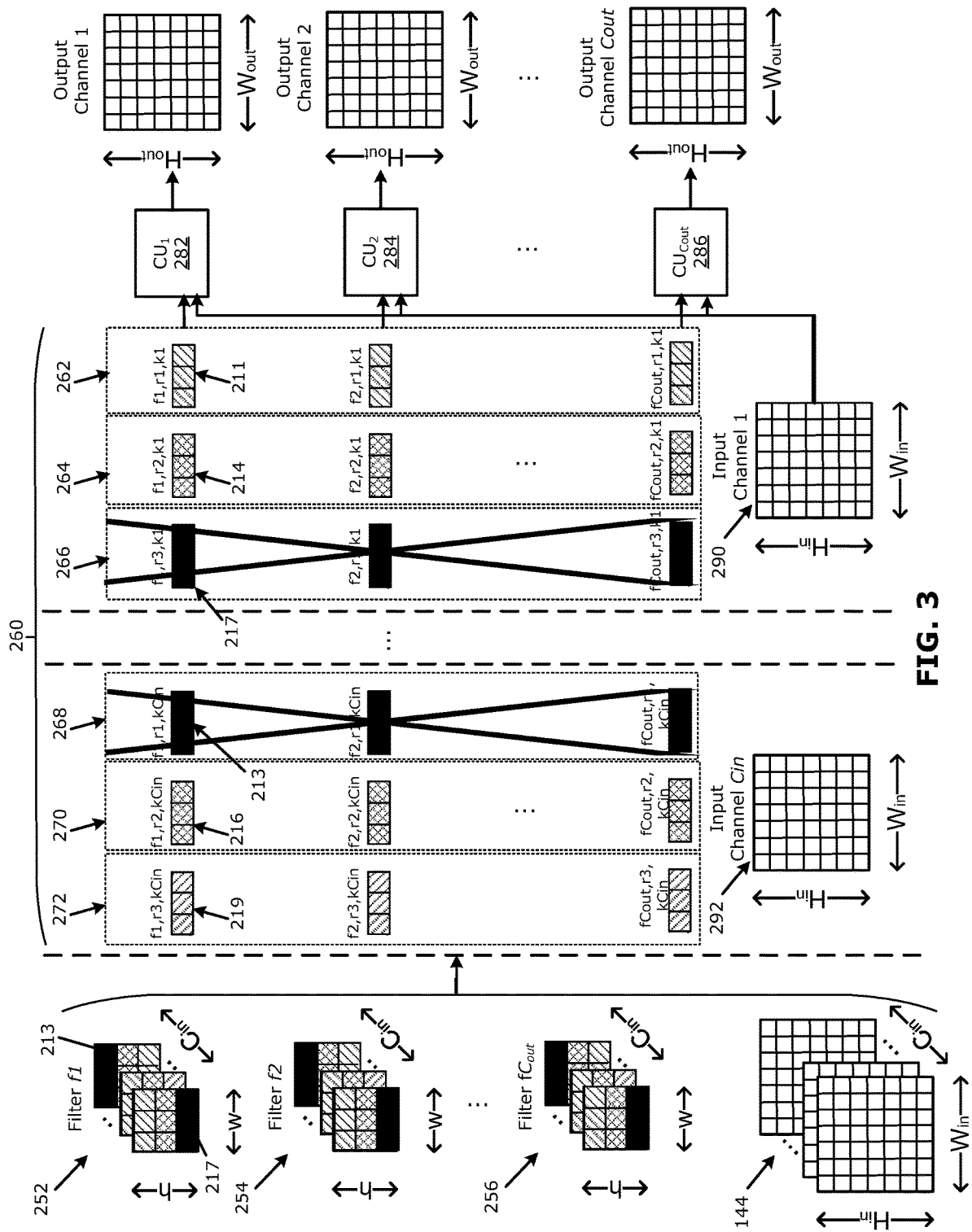
FIG. 3 is a schematic diagram of the row-wise convolution operation of FIG. 2D with row-wise pruning applied to omit data sets from the pipeline, in accordance with the present disclosure.

FIG. 3 illustrates an example of row-wise convolution using parallel hardware units and pipelined inputs with row-wise pruning of the kernels. A row pruning mask has been generated to prune certain rows from the kernels of each filter. Importantly, in this embodiment, each filter has the same rows pruned from it: thus, each filter 252 through 256 has the third row of its first kernel 217 pruned, as well as the first row of its final $C_{in}$-th kernel 213. The configuration shown in FIG. 3 is identical to that of FIG. 2D, except for the pruning of certain kernel rows; accordingly, the same objects and reference numerals shown in both FIG. 2D and FIG. 3 may be assumed to refer to the same items unless otherwise specified.

Because each filter has the same corresponding rows pruned from it, this means that the data sets in the pipeline containing those rows from each filter do not need to be processed by the CUs 282 to 286. Thus, in this example, the third dataset 266, containing the third row r3 of the first kernel k1 217 of each filter, can be eliminated from the pipeline 260. Similarly, the dataset 268, containing the first row r1 of the $C_{in}$-th kernel $kC_{in}$ 213 of each filter, can be eliminated from the pipeline 260 as well. By eliminating these data sets from the pipeline 260, fewer computations are required by the CUs to generate the output activation maps. In some embodiments, this reduces the computational cost by $hwH_{in}W_{in}$ floating-point operations (FLOPS), as well as reducing the number of external memory accesses.

The management of the data pipeline, including management of the correspondence between weight data sets and input channels, may be performed by a processing unit such as processing unit 100. As described above, the processing unit 100 may include the CUs 282 to 286 as well. In some embodiments, processing unit 100 manages the data pipeline, while the CUs 282 to 286 are implemented on one or more separate hardware platforms in communication with the processing unit 100, such as via the network interface 106. In some embodiments, the processing unit 100 also manages storage and/or addition of the partial results generated by the CUs 282 to 286 to generate each output activation map.

An example neural network may be trained using the semi-structured row-wise pruning technique described above with reference to FIG. 3. The trained network may then be used in an inference mode to perform the inference mode for which it has been trained, exhibiting the computational and memory efficiencies described above due to the reduction in network size through semi-structured row-wise pruning.

Mask Generation

Row-wise pruning mask generation is now described with reference to example embodiments. As described above, different embodiment may generate a row pruning mask using different approaches, including various techniques for pseudo-randomly or systematically selecting rows to prune from the filters of the convolution layer.

Figure 4A:
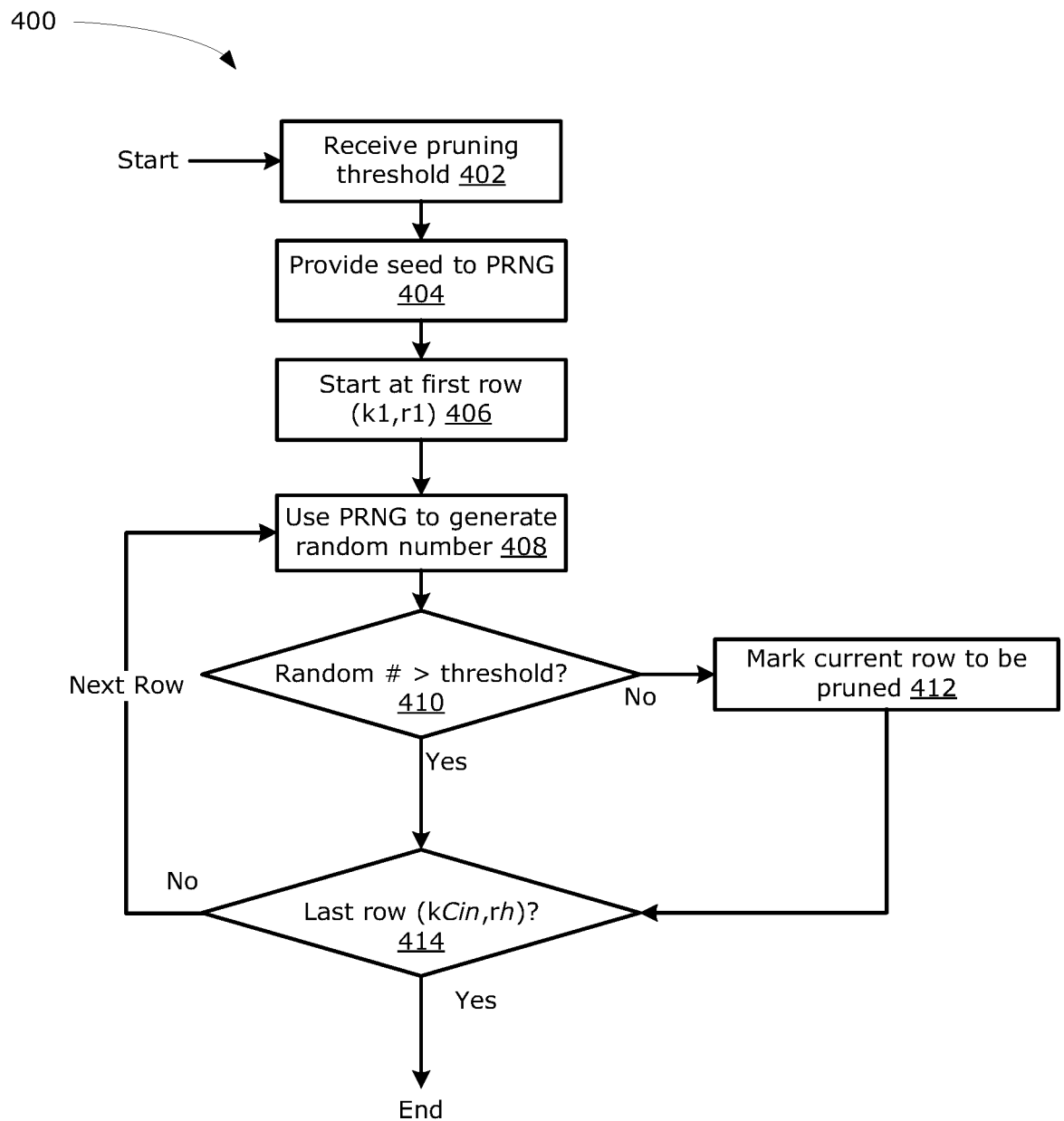
FIG. 4A is a flowchart of an example method for random semi-structured row-wise pruning mask generation, in accordance with the present disclosure.

FIG. 4A shows a flowchart of a random semi-structured pruning mask generation method 400 using a pseudo-random number generator (PRNG) to generate a row pruning mask that can be used to prune kernel rows from a filter of a convolutional layer of a convolutional neural network. The PRNG used in method 400 may in some embodiments be a hardware unit, such as a Linear-Feedback Shift Register (LFSR), that can generate a sequence of pseudo-random numbers based on aa seed value provided, herein called a seed. In the described method 400, the PRNG generates the same sequence of pseudo-random numbers (also simply referred to herein as "random numbers") based on the same seed value. This behavior may allow the method 400 to realize certain advantages, as further described below.

At 402, a pruning threshold is received. The pruning threshold is a hyper-parameter set prior to training the convolutional neural network. The pruning threshold indicates the percentage of kernel rows to be pruned from the filters of the convolution layer, i.e. the compression ratio of the convolutional layer to be achieved. It may be set to a value between 0 and 1, such as 0.4 to indicate compression to 60% of the original size of the convolutional layer, i.e. pruning of 40% of the kernel rows from the filters of the convolutional layer. Some embodiments may apply method 400 to prune multiple layers of a convolutional neural network according to the techniques described herein; in those cases, each convolutional layer may have a different pruning threshold or the same pruning threshold. The same method 400 and the same PRNG may be used to generate a row pruning mask for each convolutional layer of the convolutional neural network.

At 404, the seed is provided to the PRNG, such as the LFSR. If the row pruning mask is being generated for the first time, the seed value is stored for reference, as further described below with reference to FIG. 5. Otherwise, the seed value is retrieved from storage before being provided to the PRNG.

At 406, the first row of the row pruning mask is selected for determination of whether the first kernel row of a filter of the convolutional layer should be pruned.

At 408, the PRNG is used to generate the next random number in its sequence based on the seed provided to it. The range of random numbers that may be generated by the PRNG are normalized to a value between 0 and 1. Thus, if the PRNG generates random integer values from 0 to 4, then the random number should be normalized to the same range as the pruning threshold.

At 410, the random number generated by the PRNG is compared to the pruning threshold. If the random number is at or below the pruning threshold, this indicates that the row should be pruned, and the method proceeds to step 412. If the random number is above the pruning threshold, this indicates that the kernel row should not be pruned, and the method proceeds to step 414. It will be appreciated that the pruning threshold value and the comparison operation are arbitrary: the pruning threshold may in various embodiments be used to prune random numbers falling either above or below the pruning threshold, and the pruning threshold may be compared to either discrete or continuous values.

At 412, the current kernel row is marked to be pruned. In some embodiments, this may result in a value of zero being stored in association with the current row in a data structure in memory or storage representing the row pruning mask, thereby identifying the current row as a kernel row to be pruned. In such embodiments, the non-pruned rows of the row pruning mask would be stored as values of one. The stored mask data structure in such embodiments may be stored as arrays of three values, each array corresponding to the three rows of a kernel, each value being zero for pruned rows or one for non-pruned rows.

In other embodiments, the row pruning mask may be generated on-the-fly each time it is needed. By using a PRNG that generates a consistent sequence of random numbers in response to a given seed, the row pruning mask may be generated as needed with little to no memory overhead. If a separate hardware unit, such as an LFSR, is used to generate the random numbers, then processor resources are also conserved. In embodiments generating the row pruning mask on the fly, the pruning of a row at step 412 may constitute returning a zero value instead of a one value to the computing process referencing the row pruning mask. This zero value may be used by the computing process to omit a convolution step (such as the step of processing the third data set 266 in FIG. 3) and instead return a zero partial result for the omitted convolution step. Such an embodiments is described in greater detail below with reference to FIG. 5.

At 414, if the last row of the last kernel of the filter has been reached, the method 400 ends. Otherwise, the method 400 selects the next kernel row of the filter for a pruning determination, and returns to step 408 to generate the next random number in the sequence.

In some embodiments, method 400 may be used to generate a set of multiple row pruning masks for multiple convolutional layers of a convolutional neural network based on a single seed. In other embodiments, a different seed may be used for each convolution layer, with each convolution layer's individual seed being stored and retrieved as needed. In such embodiments, the "last row" of step 414 means the last row of the last kernel of the last filter of the last convolution network layer for which a row pruning mask is being generated. When a row pruning mask has been generated for a first convolutional layer, the sequence of random numbers continues to be used to generate a row pruning mask for a second convolutional layer, and so on until a set of row pruning masks have been generated for all convolutional layers. This allows a single seed value to be stored and retrieved to re-generate the entire set of row pruning masks.

Some such embodiments may use the same pruning threshold for all row pruning masks in the set of row pruning masks, thereby achieving the same compression ratio across all convolutional layers. Other such embodiments may apply different pruning thresholds to different layers; these multiple pruning threshold values are stored and retrieved to be used when the set of row pruning masks are re-generated.

FIG. 4B shows an example pseudo-code segment implementing "Algorithm 1" for generating a row pruning mask with a LFSR. Algorithm 1 may correspond to some embodiments of method 400. Algorithm 1 assumes kernels having h=w=k. An index value i indicates the current kernel row being processed, with the kernel rows of the row pruning mask being numbered from 1 to max (e.g., for a filter with 10 kernels and kernel height h=3, max=30). The value v is one or zero depending on the comparison of random value rv to pruning threshold t, as described above with reference to FIG. 4A. Once the mask values have been generated by appending the value v for each row in the row pruning mask, the row pruning mask is reshaped to the dimensions of a filter, allowing it to be applied to a filter, or to each filter in the convolution layer.

In embodiments generating a set of multiple row pruning masks for multiple convolutional layers of a convolutional neural network, Algorithm 1 may be executed once for each convolutional layer, or Algorithm 1 may be varied such that max is set to a value equal to the sum of the filter sizes for each convolutional layer, with a modified reshaping step applied to segment and shape the sequence of one and zero values into a set of row pruning masks.

Training

The training of the convolutional neural network using random semi-structured row-wise pruning will now be described, followed by more detailed descriptions of pseudo-code used to implement various steps carried out in the course of training in example embodiments.

Figure 5:
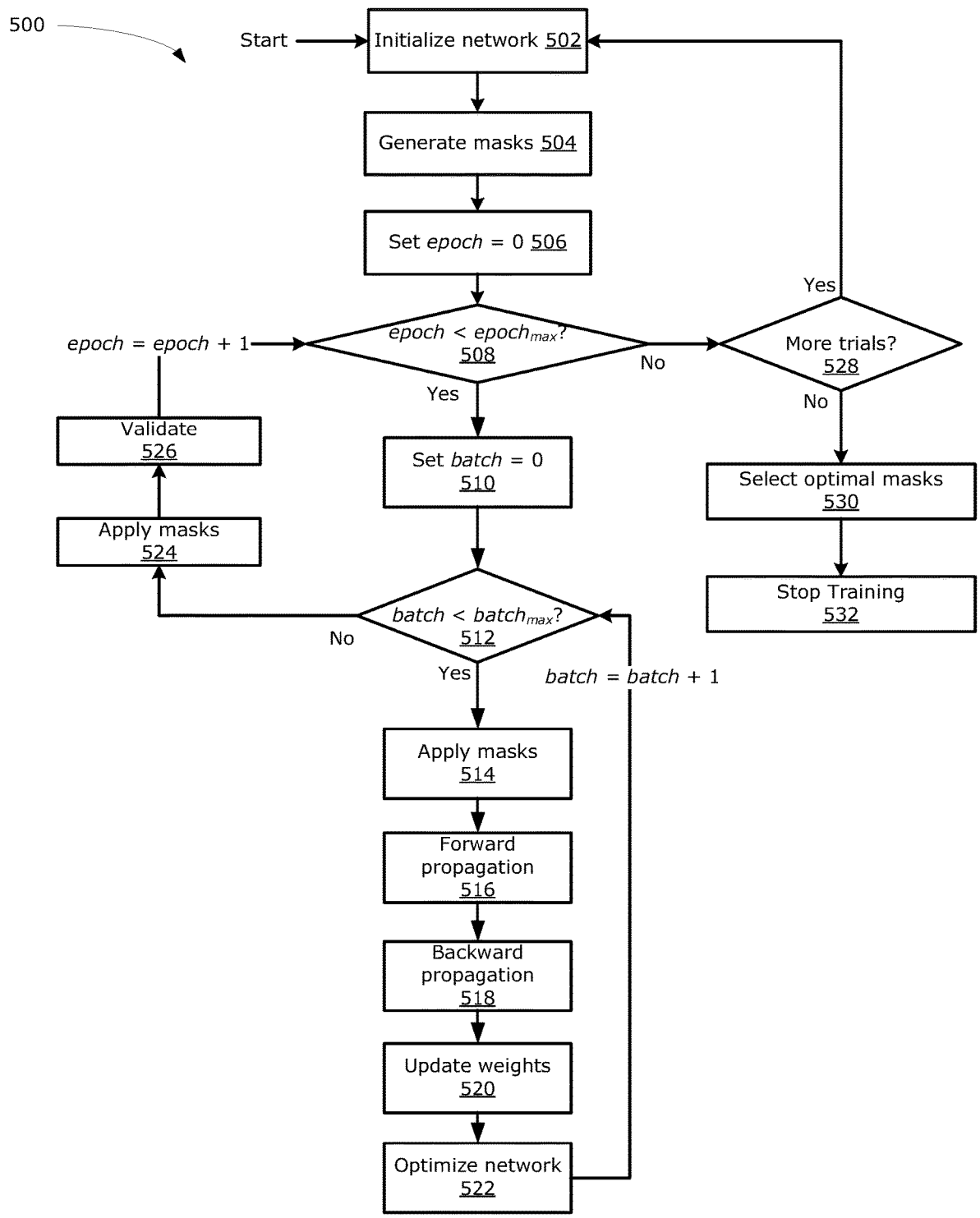
FIG. 5 is a flowchart illustrating an example method for training a neural network using semi-structured row-wise pruning, in accordance with the present disclosure.

FIG. 5 shows the operation of an example method 500 for training a convolutional neural network using random semi-structured row-wise pruning. One trial of the method 500 corresponds to a single set of row pruning masks used to perform row-wise pruning on the filters of the convolutional layers (i.e., one row pruning mask per convolutional layer of the convolutional neural network). During a trial of the method 500, the convolutional neural network is trained over multiple epochs. During each epoch, a full corpus of training data is split into multiple batches (as well as a validation dataset), and each batch of training data is forward-propagated through the convolutional neural network, followed by back-propagation to adjust the parameters (e.g. weights) of the convolutional neural network before receiving the next batch of training data. Over multiple epochs, the accuracy of the convolutional neural network should converge to an equilibrium state indicating that the convolutional neural network has been optimally trained relative to the full set of training data (i.e. parameters (e.g. weights) of the convolutional neural network are no longer changing).

Once a full trial of method 500 is complete, additional trials may be carried out using different sets of row pruning masks. Once the last trial has been performed, an optimal set of row pruning masks is selected, and training ends. The selected optimal set of row pruning masks is then used by the trained convolutional neural network at inference (i.e. when the convolutional neural network is used for prediction for the particular task it is trained for, such as object detection, object recognition, etc.).

The method 500 begins at 502, wherein the parameters of the convolutional neural network is initialized. The weights of the filters of the convolutional layers of the convolutional neural network may be set to initial values (e.g. random values). Other parameters or hyper-parameters of the convolutional neural network may be set to initial values (e.g. pre-determined values).

At 504, the row pruning masks are generated. This step 504 is described in greater detail above in the section on Mask Generation. Each row pruning mask may be stored after being generated the first time, as described above with reference to FIG. 4A-4B, either by storing the one and zero values representing the row pruning mask or by simply storing the seed value used by a PRNG to generate the random values used to generate the row pruning mask (along with the pruning threshold value or, optionally, a different pruning threshold value for each row pruning mask). In embodiments storing the row pruning mask as an array of one and zero values, the array may be retrieved from memory each time the array needs to be utilized to generate a pruned filter as described in further detail below. In embodiments storing only the seed value, the row pruning mask is re-generated each time the row pruning mask needs to be applied (i.e. utilized) to generate a pruned filter. The row pruning mask is re-generated using the seed value, the PRNG, and the pruning threshold value(s) as described above with reference to FIG. 4A-4B.

At 506, the value of a variable epoch is set to zero, indicating that the first training epoch has begun.

At 508, the value of epoch is checked and compared to a value $epoch_{max}$ indicating the maximum number of training epochs to be executed in a trial. The value of $epoch_{max}$ may be a configuration value that is predetermined when the convolutional neural network and its training procedure are designed.

If the value of epoch is less than $epoch_{max}$, indicating that at least one training epoch remains to be executed, the method 500 proceeds to step 510. Otherwise, the method 500 proceeds to step 528.

At 510, the value of a variable batch is set to zero, indicating that the first batch of training data is being used to train the convolutional neural network in the current epoch. The subsequent steps 516, 518, 520, and 522 are performed using a batch of training data corresponding to the value of batch.

At 512, the value of batch is checked and compared to a value $batch_{max}$ indicating the maximum number of batches of training data to be used in each training epoch. The value of $batch_{max}$ may be a hyper-parameter that is predetermined before training the convolutional neural network.

If the value of batch is less than $batch_{max}$, indicating that at least one training batch of training data remains to be propagated through the network in the current epoch, the method 500 proceeds to step 514. Otherwise, the method 500 proceeds to step 524.

At 514, the set of row pruning masks generated at step 504 are applied to the filters of a convolutional layer of the convolutional neural network to generate a set of pruned filters. In other words, the set of row pruning masks generated at step 504 are utilized to prune the filters of the convolutional layer. As described above in the section on Mask Generation, the set of row pruning masks may consist of a sequence of one and zero values corresponding to un-pruned and pruned kernel rows, respectively (called "pruning values" or "mask values" herein). Some embodiments may retrieve these pruning values from memory where they were stored after being generated at step 504; other embodiments may re-generate the set of row pruning masks by feeding the stored seed value used to initially generate the row pruning mask to a PRNG and executing the method 400 of FIG. 4A to re-generate the set of row pruning masks on the fly, one pruning value at a time, before applying the set row pruning masks to the filters to prune kernel rows from the filters of the convolutional layer.

In some embodiments, applying the set of row pruning masks to the filters to prune kernel rows from filters of a convolution layer includes multiplying each pruning value (one or zero) by the weights of the corresponding kernel row of a filter. This process is repeated for each filter in the convolutional layer, applying the same row pruning mask to each filter to prune the same set of kernel rows for each filter of the convolutional layer. Some embodiments may store the pruned kernels with their zero-value weights in pruned rows; other embodiments may instead apply a single pruning value of the row pruning mask to a single kernel row when the kernel row is being processed, e.g. when it is being processed by the CUs of FIG. 3.

The data pipelines used to perform the convolution operations for each layer of the network may be modified accordingly: the processing unit 100 or other system(s) used to manage the pipeline and the output of the convolution operations of the CUs 282 to 286 keeps track of which rows have been pruned, omitting those data sets from the pipeline 260 and synchronizing the kernel rows and input channels being provided to the CUs in the pipeline.

At 516, the current batch (corresponding to the current value of batch) is forward propagated through the neural network. For each data input (such as a labelled image from the current batch), each convolution layer in turn applies its filters to the input activation maps received from the previous layer or block of the network, using the convolution operation with row-wise pruning described above with reference to FIG. 3. The activation maps generated thereby by each layer are propagated forward to the next layer in the network. The final layer or block of the network generates inference data, such as an inferred category of an object present in the labelled image provided to the network as input.

At 518, a loss function is propagated backward through the neural network. A loss function is applied to the output of the network (i.e. the inference data), comparing the output to the label of the labelled input data. The loss calculated thereby is propagated back through each layer of the network, starting with the final layer, to calculate gradients for each layer according to known supervised learning techniques. Each layer receives the backwards propagated error from the layer one step closer to the output, and uses the backwards propagated error and the loss function to compute the gradients of the current layer.

At 520, the parameters of the convolutional neural network, including the weights of the filters of the convolutional layers of the convolutional neural network are adjusted based on the result of the back-propagation, i.e. the computed gradients. In convolutional layers that have undergone row-wise pruning as described above, the pruned rows do not need to have their weights adjusted, because the values of these weight of these rows are effectively fixed at zero.

At 522, the parameters of the convolutional neural network, including the weights of the filters of the convolutional layers are optimized. The parameters of the convolutional neural network, including the weights of the filters of the convolutional layers of the convolutional neural network are adjusted to minimize the loss function, using an optimization technique such as Adam (Adaptive Moment Estimation), Adagrad (Adaptive Gradient algorithm), RMSProp (Root Mean Square Propagation), or another optimization technique.

After 522, the method 500 increments the value of batch by one and returns to step 512.

When the method 500 reaches step 524, it means that the final batch of training data in the corpus of training data has been forward-propagated through the convolutional neural network, and the resulting loss has been back-propagated backward through the convolutional neural network to adjust and optimize the parameters of the convolutional neural network, including the weights of the convolutional layers of the convolutional neural network. At 524, the row pruning masks are applied to the network again to prepare for validation. Step 524 may use the same approach for applying the row pruning mask as step 514.

At 526, the training of the convolutional neural network is validated. The validation dataset reserved from the corpus of training data when the batches were prepared is used to validate the trained convolutional neural network (i.e. the parameters of the convolutional neural network learned during training). A performance metric is applied to the inference data generated by the network to generate performance data. This performance data provides a metric to determine whether, and to what extent, successive training epochs are resulting in convergence of parameters of the convolutional neural network, including the weights of the filters of the convolutional layers of the convolutional neural network and improvement in the inferential ability of the convolutional neural network. It also provides a metric for comparing successive trials of the training method 500 to determine which trial's set of row pruning masks generates optimal results.

After validation at step 526, the value of epoch is incremented by one and the method 500 returns to step 508.

When the method 500 reaches step 528, it means that the final training epoch has been completed for the current trial. A determination is made as to whether further trials should be run: in some embodiments, this determination may use a counter incremented after each trial and a predetermined configuration value $trials_{max}$ analogous to $epoch_{max}$ and $batches_{max}$. In other embodiments, trials may continue until a threshold level of performance is reached. Some embodiments may use a similar performance-threshold limit for determining the number of training epochs to execute, instead of executing a fixed number of epochs $epoch_{max}$ as described above. It will be appreciated that each successive trial essentially tests the performance of a different set of row pruning masks used in training the network.

If it is determined at step 528 that more trials will be run, the method 500 returns to step 502 to re-initialize the network and begin a new trial of the method 500.

If it is determined at step 528 that no more trials will be run, the method 500 proceeds to step 530. At 530, the sets of row pruning masks used in each trial are compared on the basis of the validation performed at step 526 of each trial. An optimization metric is applied, which may identify the optimal set of row pruning masks based on some combination of the degree of compression of the convolutional neural network achieved (i.e. the number of kernel rows pruned from the filters of the convolutional layer) and the inferential performance of the convolutional neural network measured by validation during the trial using the optimal set of row pruning masks.

Once an optimal set of row pruning masks has been selected at step 530, the training process ends at step 532. The trained convolutional neural network (i.e. the convolutional neural network with learned parameters, including learned weights of the filters of the convolutional layers) is now ready to be deployed and used for inference in conjunction with the application of the optimal set of row pruning masks selected at step 530. For some tasks, the trained convolutional neural network should exhibit the efficiencies identified above with respect to faster inference time and/or decreased memory access requirements. In some embodiments, the convolutional trained neural network may have no need to store the indices of the non-pruned weights as in existing unstructured pruning approaches, as the indices of the pruned weight (or the indices of the non-pruned weight) are re-generated when the trained convolutional neural network is used for inference. This may further decrease memory storage and access needs, resulting in further efficiencies during inference.

Individual steps carried out as part of method 500 are described below in greater detail, with reference to example pseudo-code.

Some embodiments may vary the sequence of various steps in the training method 500. As noted above, batches of the set of training data are forward-propagated through the network before performing back-propagation. The batch size is a hyper-parameter predetermined before training and may be any size in the range of 1 to the total size of the set of training data.

Different embodiments may vary or hold constant various hyper-parameters in between trials, or across different convolutional layers of the convolutional neural network. For example, as described above, some embodiments may use the same threshold value for all convolutional layers, thereby generating a set of row pruning masks that result in all convolutional layers having the same compression ratio. Other embodiments may use different thresholds for each layer; this means that the threshold values must be stored and retrieved along with the seed value each time a set of row pruning masks is re-generated. Some embodiments may use a single threshold value, or a single set of threshold values for the layers of the network, in every trial. Other embodiments may vary the threshold value(s) used in each trial, with the optimal row pruning mask selection step 530 applying a metric that takes into account compression ratio or efficiency as well as accuracy. In some embodiments, the threshold value(s) may be varied across multiple trials, while the seed value is re-used: this may result in a sequence of trials with gradually increasing compression or efficiency, while accuracy may gradually decrease. Choosing an optimal set of row pruning masks at step 230 may then consist of, for example, applying a metric that selects the set of row pruning masks with the greatest degree of compression while exhibiting accuracy above a predetermined accuracy threshold. It will be appreciated that other variants of hyper-parameter values may be used in different layers of the network or different trials of method 500 to achieve different training and optimization goals.

During each epoch of the trial in which they are used, the row pruning masks generated for each layer (e.g. using Algorithm 1) are applied to the weights of the neural network at step 414 before forward propagation at step 416 and after optimization at step 422. Applying the row pruning masks at step 414 and/or step 524 may in some embodiments be performed in accordance with the example pseudo-code segment of FIG. 6 implementing Algorithm 2 for pruning the network using the generated set of row pruning masks. Algorithm 2 applies the row pruning masks to the weight matrices using matrix multiplication. Algorithm 2 refers to the neural network as the "model". In some embodiments, Algorithm 2 may be executed to only prune a subset of layers of the network.

FIG. 7 shows an example pseudo-code segment implementing Algorithm 3 for executing a single trial of method 400.

FIG. 8 shows an example pseudo-code segment implementing Algorithm 4 for using the network, after being trained with row-wise pruning in accordance with method 400, to perform the inference task for which it has been trained.

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure, are incorporated herein by reference.

Further aspects and examples of the present disclosure are presented in the Appendix attached hereto, the entirety of which is hereby incorporated into the present disclosure.

The invention claimed is:

1. A method for pruning filters of a convolutional layer of a convolutional neural network performed by a processor, the method comprising:
receiving a pruning threshold indicating a desired compression ratio for the convolutional layer of the convolutional neural network, wherein the convolutional layer comprises a plurality of filters;
providing a seed value to a pseudo-random number generator;
generating a row pruning mask identifying a plurality of kernel rows of a first filter of the plurality of filters to be pruned, wherein generating the row pruning mask comprises:
generating, using the pseudo-random number generator, a sequence of pseudo-random numbers based on the seed value; and
for each kernel row of the first filter, determining whether to identify the kernel row of the first filter as one of the plurality of kernel rows to be pruned based on a comparison of the pseudo-random number to the pruning threshold;
generating a pruned first filter in accordance with the generated row pruning mask and the first filter, the pruned first filter comprising at least the kernel rows of the first filter not identified as kernel rows to be pruned;
generating a plurality of pruned filters in accordance with the generated row pruning mask and the plurality of filters; and
applying the plurality of pruned filters to an input data array in one or more convolution operations to generate an output data array.

2. The method of claim 1, further comprising:
for each additional filter of a plurality of additional filters of the convolutional layer, generating an additional pruned filter in accordance with the generated row pruning mask and the additional filter, each additional pruned filter comprising a plurality of kernel rows of the additional filter at positions within the additional filter corresponding to positions of the kernel rows of the first filter not identified as kernel rows to be pruned.

3. The method of claim 1, further comprising:
for each additional filter of a plurality of additional filters of the convolutional layer:
generating an additional row pruning mask identifying a plurality of kernel rows of an additional filter of the convolutional layer to be pruned, wherein generating an additional row pruning mask comprises:
generating, using the pseudo-random number generator, an additional pseudo-random number sequence based on the seed value; and
for each kernel row of the additional filter of the convolutional layer, determining whether to identify the kernel row of the additional filter as one of the plurality of kernel rows to be pruned based on a comparison of the pseudo-random number to the pruning threshold; and
generating an additional pruned filter in accordance with the additional filter and the additional row pruning mask, the additional pruned filter comprising at least the kernel rows of the additional filter not identified as kernel rows to be pruned.

4. The method of claim 1, wherein the pseudo-random number generator is a Linear Feedback Shift Register.

5. The method of claim 1, wherein each kernel row of the first filter comprises a plurality of weight values, wherein generating the row pruning mask further comprises setting the weight values of each kernel row to be pruned to zero.

6. The method of claim 2, further comprising:
receiving one or more input activation maps at the convolutional layer; and
generating, at the convolutional layer by an accelerator, a plurality of output activation maps by convolving the kernel rows of the pruned first filter and the kernel rows of the additional pruned filters with each of the one or more input activation maps.

7. The method of claim 1, further comprising:
for each of one or more additional convolutional layers of the convolutional neural network:
generating a row pruning mask identifying a plurality of kernel rows to be pruned from a first filter of the additional convolutional layer, wherein the row pruning mask is generated by:
generating, using the pseudo-random number generator, a sequence of pseudo-random numbers sequence based on the seed value; and
for each kernel row of the first filter of the plurality of filters, determining whether to identify the kernel row of the first filter as one of the plurality of kernel rows to be pruned based on the pseudo-random number to the pruning threshold; and
generating the pruned first filter in accordance with the generated row pruning mask and the first filter, the pruned first filter comprising at least the kernel rows of the first filter not identified as kernel rows to be pruned.

8. The method of claim 7, further comprising:
training the convolutional neural network in accordance with training data of a training data set, the pruned first filter, and the additional pruned filters to update parameters of the convolutional neural network; and
validating the convolutional neural network in accordance with validation data of the training data set, the pruned first filter to determine an accuracy of the convolutional neural network for the seed value.

9. The method of claim 8, wherein providing the seed value, generating the row pruning mask, generating the pruned first filter, generating the additional pruned filters, training the convolutional neural network, and validating the convolutional neural network are included in a first trial, the method further comprising:
performing one or more additional trials, each additional trial comprising:
initializing parameters of the convolutional neural network; and
repeating providing a seed value, generating the row pruning mask for the convolutional layer and the additional convolutional layers, generating the pruned filters for the convolutional layer, generating the additional pruned filters for each additional convolutional layer, re-training the convolutional neural network in accordance with the training data of the training data set, the pruned filters and the additional pruned filters, and validating the convolutional neural network in accordance with the validation data of the training data set to determine the accuracy of the convolutional neural network, wherein a separate seed value is used for each trial; and
selecting an optimal seed value from the seed values used for each trial based on the accuracy of the convolutional neural network determined for each seed value.

10. The method of claim 6, wherein:
convolving the kernel rows of the pruned first filter and the kernel rows of the additional pruned filters with each of the one or more input activation maps comprises performing row-wise convolution of the pruned first filter and each additional pruned filter with the one or more input activation maps by:
providing each kernel row of each pruned filter to one or more computing units, each computing unit comprising a number of multiply-and-accumulate units equal to the number of weights in each kernel row;
providing the input activation maps to the computing units; and
using the multiply-and-accumulate units of each of the computing units to convolve the kernel rows with respective input activation maps to generate a plurality of partial convolution results;
accumulating the partial convolution results to generate the plurality of output activation maps.

11. The method of claim 10, wherein:
the one or more computing units comprises a number of computing units equal to a value U;
providing each kernel row to the computing units comprises providing a kernel row sequence of kernel rows to the U computing units, the kernel row sequence comprising a sequence of data sets, each data set comprising U kernel rows, each kernel row of a given data set being provided as a first data input to a respective computing unit;
providing the input activation maps to the computing units comprises providing a channel sequence of input activation maps to the computing units, each input activation map in the channel sequence being provided as a second data input to the computing units while a corresponding one or more data sets of the kernel row sequence are being sequentially provided as the first data input to the computing units; and
the U kernel rows in any given data set are all from an identical position within each of U pruned filters.

12. The method of claim 11, wherein U is equal to the number of filters in the convolutional layer.

13. A system comprising:
a processor;
a pseudo-random number generator; and
a memory storing instructions which, when executed by the processor device, cause the system to:
receive a pruning threshold indicating a desired compression ratio for a convolutional layer of a convolutional neural network, wherein the convolutional layer comprises a plurality of filters;
provide a seed value to a pseudo-random number generator;
generate a row pruning mask identifying a plurality of kernel rows of a first filter of the plurality of filters to be pruned, wherein generating the row pruning mask comprises:
generating, using the pseudo-random number generator, a sequence of pseudo-random numbers based on the seed value; and
for each kernel row of the first filter, determining whether to identify the kernel row of the first filter as one of the plurality of kernel rows to be pruned based on a comparison of the pseudo-random number to the pruning threshold;

generate a pruned first filter in accordance with the generated row pruning mask and the first filter, the pruned first filter comprising at least the kernel rows of the first filter not identified as kernel rows to be pruned;

generate a plurality of pruned filters in accordance with the generated row pruning mask and the plurality of filters; and apply the plurality of pruned filters to an input data array in one or more convolution operations to generate an output data array.

14. The system of claim 13, wherein the instructions, when executed by the processor device, further cause the system to generate, for each additional filter of a plurality of additional filters of the convolutional layer, generating an additional pruned filter in accordance with the generated row pruning mask and the additional filter, each additional pruned filter comprising a plurality of kernel rows of the additional filter at positions within the additional filter corresponding to positions of the kernel rows of the first filter not identified as kernel rows to be pruned.

15. The system of claim 14, wherein the instructions, when executed by the processor device, further cause the system to:

for each additional filter of a plurality of additional filters of the convolutional layer:
generating an additional row pruning mask identifying a plurality of kernel rows of an additional filter of the convolutional layer to be pruned, wherein generating an additional row pruning mask comprises:
generating, using the pseudo-random number generator, an additional pseudo-random number sequence based on the seed value; and
for each kernel row of the additional filter of the convolutional layer, determining whether to identify the kernel row of the additional filter as one of the plurality of kernel rows to be pruned based on a comparison of the pseudo-random number to the pruning threshold; and
generating an additional pruned filter in accordance with the additional filter and the additional row pruning mask, the additional pruned filter comprising at least the kernel rows of the additional filter not identified as kernel rows to be pruned.

16. The system of claim 13, wherein the pseudo-random number generator is a Linear Feedback Shift Register.

17. The system of claim 13, wherein each kernel row of the first filter comprises a plurality of weight values, wherein generating the row pruning mask further comprises setting the weight values of each kernel row to be pruned to zero.

18. The system of claim 14, further comprising one or more computing units, each computing unit comprising a number of multiply-and-accumulate units equal to the number of weights in each kernel row, wherein the instructions, when executed by the processor device, further cause the system to:

provide each kernel row of each pruned filter to the computing unit;

providing the input activation maps to the computing units; and using the multiply-and-accumulate units of each of the computing units to convolve the kernel rows with respective input activation maps to generate a plurality of partial convolution results;

accumulating the partial convolution results to generate a plurality of output activation maps.

19. The system of claim 18, wherein:

the one or more computing units comprises a number of computing units equal to a value U;

providing each kernel row to the computing units comprises providing a kernel row sequence of kernel rows to the U computing units, the kernel row sequence comprising a sequence of data sets, each data set comprising U kernel rows, each kernel row of a given data set being provided as a first data input to a respective computing unit;

providing the input activation maps to the computing units comprises providing a channel sequence of input activation maps to the computing units, each input activation map in the channel sequence being provided as a second data input to the computing units while a corresponding one or more data sets of the kernel row sequence are being sequentially provided as the first data input to the computing units; and the U kernel rows in any given data set are all from an identical position within each of U pruned filters.

20. A non-transitory computer-readable medium having instructions tangibly stored thereon, wherein the instructions, when executed by a processing unit, causes the processing unit to:

receive a pruning threshold indicating a desired compression ratio for a convolutional layer of a convolutional neural network, wherein the convolutional layer comprises a plurality of filters;

provide a seed value to a pseudo-random number generator;

generate a row pruning mask identifying a plurality of kernel rows of a filter of the convolutional layer to be pruned, wherein generating the row pruning mask comprises:
generating, using the pseudo-random number generator, a sequence of pseudo-random numbers based on the seed value; and
for each kernel row of the first filter, determining whether to identify the kernel row of the first filter as one of the plurality of kernel rows to be pruned based on a comparison of the pseudo-random number to the pruning threshold;

generate a pruned first filter in accordance with the generated row pruning mask and the first filter, the pruned first filter comprising at least the kernel rows of the first filter not identified as kernel rows to be pruned;

generate a plurality of pruned filters in accordance with the generated row pruning mask and the plurality of filters; and apply the plurality of pruned filters to an input data array in one or more convolution operations to generate an output data array.

* * * * *